(12) United States Patent
Burtscher et al.

(10) Patent No.: US 10,599,638 B2
(45) Date of Patent: Mar. 24, 2020

(54) SYSTEM AND METHOD FOR IDENTIFYING MAXIMAL INDEPENDENT SETS IN PARALLEL

(71) Applicant: The Texas State University-San Marcos, San Marcos, TX (US)

(72) Inventors: Martin Burtscher, Austin, TX (US); Sindhu Devale, Austin, TX (US)

(73) Assignee: The Texas State University-San Marcos, San Marcos, TX (US)

( * ) Notice: Subject to any disclaimer, the term of this patent is extended or adjusted under 35 U.S.C. 154(b) by 0 days.

(21) Appl. No.: 16/483,285

(22) PCT Filed: Feb. 6, 2017

(86) PCT No.: PCT/US2017/016673
§ 371 (c)(1),
(2) Date: Aug. 2, 2019

(87) PCT Pub. No.: WO2018/144030
PCT Pub. Date: Aug. 9, 2018

(65) Prior Publication Data
US 2020/0012636 A1    Jan. 9, 2020

(51) Int. Cl.
*G06F 17/30* (2006.01)
*G06F 16/23* (2019.01)
*G06F 16/901* (2019.01)

(52) U.S. Cl.
CPC ...... *G06F 16/2379* (2019.01); *G06F 16/9024* (2019.01)

(58) Field of Classification Search
USPC ............................. 707/703, 791, 798
See application file for complete search history.

(56) References Cited

U.S. PATENT DOCUMENTS

| 2007/0234258 A1 | 10/2007 | Lee et al. | |
| 2007/0239694 A1* | 10/2007 | Singh | G06F 16/9024 |
| 2011/0173189 A1* | 7/2011 | Singh | G06F 16/9024 707/722 |

(Continued)

OTHER PUBLICATIONS

PCT International Search Report and Written Opinion for International Application No. PCT/US2017/016673, dated Apr. 12, 2017, 12 pages.

*Primary Examiner* — Hung T Vy
(74) *Attorney, Agent, or Firm* — Baker Botts L.L.P.

(57) ABSTRACT

A method for identifying maximal independent sets in parallel may include, on a processor, accessing data representing an undirected graph, generating a respective initial priority value for each vertex, dependent on the vertex degree and an average degree for vertices in the graph, and recording an indication of the initial priority value for each vertex. The method may include determining, for multiple vertices, that no neighbor vertex has a priority value that is higher than that of the vertex. In response, the method may include recording respective indications that each neighbor vertex connected is not to be included in a maximal independent set for the undirected graph and recording an indication that the vertex is to be included in the maximal independent set. The determinations and recordings may be performed in parallel by respective processing elements of the processor. The processor may be a GPU.

25 Claims, 4 Drawing Sheets

(56) References Cited

U.S. PATENT DOCUMENTS

| | | |
|---|---|---|
| 2011/0307485 A1 | 12/2011 | Udupa et al. |
| 2014/0137130 A1* | 5/2014 | Jacob .................. G06F 9/46 718/103 |
| 2015/0324410 A1 | 11/2015 | Glover |
| 2016/0212023 A1 | 7/2016 | Mohan et al. |

\* cited by examiner

SYSTEM AND METHOD FOR IDENTIFYING MAXIMAL INDEPENDENT SETS IN PARALLEL

STATEMENT OF GOVERNMENT INTEREST

This invention was made with government support under Grant no. 1406304 awarded by the National Science Foundation (NSF). The government has certain rights in the invention.

RELATED APPLICATION

This application is a national phase of International Application No. PCT/US2017/016673 filed Feb. 6, 2017.

FIELD OF THE DISCLOSURE

The present disclosure relates generally to the field of parallel computing and, more particularly, to systems and methods for identifying maximal independent sets in parallel by multiple processors or processing elements.

DESCRIPTION OF THE RELATED ART

A graph may be considered the most general data structure in that all other data structures can be modeled as graphs. A graph includes a collection of vertices, some pairs of which are connected to each other by edges. Pairs of vertices that are connected by an edge are referred to as adjacent vertices. An undirected graph is a graph in which the edges represent bidirectional connections between adjacent vertices. An independent set of an undirected graph is a subset of its vertices such that none of the vertices in the set are adjacent to each other. An independent set is referred to as a maximal independent set (or MIS) if all remaining vertices in the graph are adjacent to at least one vertex in the independent set.

Maximal independent sets are not unique. Maximal independent sets having the largest possible number of vertices are called maximum independent sets. Maximum independent sets are also not unique. Finding a maximum independent set is NP-hard. Therefore maximal independent sets are often used in practice instead.

The determination of a maximal independent set is a basic building block of many parallel graph processing algorithms, including those that implement graph coloring, maximal matching, 2-satisfiability, maximal set packing, the odd set cover problem, and coarsening in algebraic multigrid. A maximal independent set can also be employed to parallelize computations for parallel execution, including computations with arbitrary and dynamically changing conflicts. A maximal independent set can be computed using a sequential approach or a parallel approach.

High performance computers (HPCs) are clusters of computers designed to solve complex problems in fields such as weather forecasting, material modeling, social simulation, and geology. Commercially available HPCs typically include processor arrays that include from 16 to 64 processing elements, while some research machines include substantially higher numbers of processing elements. For example, server-class machine may include a multi-threaded, multi-core processor, such as a 20-core CPU with 40 threads. In some HPCs, at least some of the CPUs (and their constituent cores) may be replaced by arrays of graphics processing elements (e.g., GPUs). A major transition to cloud-based services and exascale computing, both of which employ HPCs, is currently underway.

SUMMARY

The disclosure relates to systems and methods for identifying maximal independent sets in parallel. In one aspect, method may include, on a processor, accessing data representing an undirected graph, the undirected graph including vertices and edges, each edge connecting a respective pair of vertices, generating a respective initial priority value for each vertex, the initial priority being dependent on the degree of the vertex and on an average degree for vertices in the undirected graph, recording an indication of the respective initial priority value for each vertex in a memory, determining, for each vertex in a first plurality of vertices in the undirected graph, dependent on the indications recorded in the memory, that no neighbor vertex connected to the vertex by one of the edges in the undirected graph has a priority value that is higher than the initial priority value for the vertex, and recording, in the memory in response to a determination that no neighbor vertex connected to a first one of the first plurality of vertices by one of the edges has a priority value that is higher than the initial priority value for the first vertex, respective indications that each neighbor vertex connected to the first vertex by one of the edges is not to be included in a maximal independent set for the undirected graph, and an indication that the first vertex is to be included in the maximal independent set for the undirected graph.

In any of the disclosed embodiments, for each vertex in the undirected graph, recording an indication of the respective initial priority value for the vertex may include storing, in a data structure associated with the vertex, a value that simultaneously represents an indication of an undecided status for the vertex and the respective initial priority value for the vertex, recording a respective indication that each neighbor vertex connected to the vertex by one of the edges is not to be included in a maximal independent set for the undirected graph may include storing, in a respective data structure associated with the neighbor vertex, a first designated priority value that represents an indication of an out status for the neighbor vertex, recording an indication that the vertex is to be included in the maximal independent set for the undirected graph may include storing, in the data structure associated with the vertex, a second designated priority value that represents an in status for the vertex, and the value that simultaneously represents an indication of an undecided status for the vertex and the respective initial priority value for the vertex may be a value other than the first designated priority value or the second designated priority value.

In any of the disclosed embodiments, the first designated priority value may be the lowest possible value to be stored in the respective data structure associated with each neighbor vertex, the second designated priority value may be the highest possible value to be stored in the data structure associated with the vertex, and the value that simultaneously represents an indication of an undecided status for the vertex and the respective initial priority value for the vertex may be a value that lies between the first designated priority value and the second designated priority value.

In any of the disclosed embodiments, the first designated priority value may be an even number, the second designated priority value may be an even number, and the value that simultaneously represents an indication of an undecided status for the vertex and the respective initial priority value for the vertex may be an odd number.

In any of the disclosed embodiments, the method may further include determining, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices, the determination being performed for the vertex in the second plurality of vertices in parallel with the determinations being performed for the first plurality of vertices, and in response to determining that a neighbor vertex connected to the vertex in the second plurality of vertices by one of the edges in the undirected graph has a priority value that is higher than the initial priority value for the vertex in the second plurality of vertices, refraining from recording data representing a status for the vertex in the second plurality of vertices in the respective data structure associated with the vertex in the second plurality of vertices, and refraining from determining whether an additional neighbor vertex connected to the vertex in the second plurality of vertices by one of the edges in the undirected graph has a priority value that is higher than the initial priority value for the vertex in the second plurality of vertices.

In any of the disclosed embodiments, the method may further include recording, in the memory in response to a determination that no neighbor vertex connected to a second one of the first plurality of vertices by one of the edges has a priority value that is higher than the initial priority value for the second vertex, respective indications that each neighbor vertex connected to the second vertex by one of the edges is not to be included in a maximal independent set for the undirected graph, and an indication that the second vertex is to be included in the maximal independent set for the undirected graph. At least one of the determinations and the recordings may be performed asynchronously and in parallel by respective ones of a plurality of processing elements of the processor.

In any of the disclosed embodiments, recording the indication that the first vertex is to be included in the maximal independent set for the undirected graph may be performed subsequent to recording the respective indications that each neighbor vertex connected to the first vertex by one of the edges is not to be included in a maximal independent set for the undirected graph. The method may further include determining that the vertices in the first plurality of vertices have an undecided status, and determining, for each vertex in a first plurality of vertices in the undirected graph, that no neighbor vertex connected to the vertex by one of the edges in the undirected graph has a priority value that is higher than the initial priority value for the vertex may be performed in response to the determination that the vertices in the first plurality of vertices have an undecided status.

In any of the disclosed embodiments, generating the respective initial priority value for each vertex may include obtaining the average degree for vertices in the undirected graph, adding the vertex degree to the average degree for vertices in the undirected graph to produce a sum, and dividing the average degree for vertices in the undirected graph by the sum to produce the respective initial priority value.

In any of the disclosed embodiments, generating the respective initial priority value for each vertex may include obtaining the average degree for vertices in the undirected graph, generating a random number dependent on a unique identifier of the vertex, subtracting the random number from the degree of the vertex to produce a modified vertex degree, adding the modified vertex degree to the average degree for vertices in the undirected graph to produce a sum, and dividing the average degree for vertices in the undirected graph by the sum to produce the respective initial priority value.

In another aspect, at least one non-transitory, computer-readable medium may store instructions that when executed by a processor comprising a plurality of processing elements cause the processor to perform accessing data representing an undirected graph, the undirected graph including vertices and edges, each edge connecting a respective pair of vertices, generating a respective initial priority value for each vertex, the initial priority being dependent on the degree of the vertex and on an average degree for vertices in the undirected graph, recording an indication of the respective initial priority value for each vertex in a memory, determining, for each vertex in a first plurality of vertices in the undirected graph, dependent on the indications recorded in the memory, that no neighbor vertex connected to the vertex by one of the edges in the undirected graph has a priority value that is higher than the initial priority value for the vertex, recording, in the memory in response to a determination that no neighbor vertex connected to a first one of the first plurality of vertices by one of the edges has a priority value that is higher than the initial priority value for the first vertex, respective indications that each neighbor vertex connected to the first vertex by one of the edges is not to be included in a maximal independent set for the undirected graph, and an indication that the first vertex is to be included in the maximal independent set for the undirected graph. The instructions may also cause the processor to perform determining, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices, the determination being performed for the vertex in the second plurality of vertices in parallel with the determinations being performed for the first plurality of vertices, and in response to determining that a neighbor vertex connected to the vertex in the second plurality of vertices by one of the edges in the undirected graph has a priority value that is higher than the initial priority value for the vertex in the second plurality of vertices, refraining from recording data representing a status for the vertex in the second plurality of vertices in the respective data structure associated with the vertex in the second plurality of vertices, and refraining from determining whether an additional neighbor vertex connected to the vertex in the second plurality of vertices by one of the edges in the undirected graph has a priority value that is higher than the initial priority value for the vertex in the second plurality of vertices.

In any of the disclosed embodiments, for each vertex in the undirected graph, recording an indication of the respective initial priority value for the vertex may include storing, in a data structure associated with the vertex, a value that simultaneously represents an indication of an undecided status for the vertex and the respective initial priority value for the vertex, recording a respective indication that each neighbor vertex connected to the vertex by one of the edges is not to be included in a maximal independent set for the undirected graph may include storing, in a respective data structure associated with the neighbor vertex, a first designated priority value that represents an indication of an out status for the neighbor vertex, recording an indication that the vertex is to be included in the maximal independent set for the undirected graph may include storing, in the data structure associated with the vertex, a second designated priority value that represents an in status for the vertex, and the value that simultaneously represents an indication of an undecided status for the vertex and the respective initial priority value for the vertex may be a value other than the first designated priority value or the second designated priority value.

In any of the disclosed embodiments, the first designated priority value may be the lowest possible value to be stored in the respective data structure associated with each neighbor vertex, the second designated priority value may be the highest possible value to be stored in the data structure associated with the vertex, and the value that simultaneously represents an indication of an undecided status for the vertex and the respective initial priority value for the vertex may be a value that lies between the first designated priority value and the second designated priority value.

In any of the disclosed embodiments, the first designated priority value may be an even number, the second designated priority value may be an even number, and the value that simultaneously represents an indication of an undecided status for the vertex and the respective initial priority value for the vertex may be an odd number.

In any of the disclosed embodiments, when executed by the processor, the instructions may further cause the processor to perform recording, in the memory in response to a determination that no neighbor vertex connected to a second one of the first plurality of vertices by one of the edges has a priority value that is higher than the initial priority value for the second vertex, respective indications that each neighbor vertex connected to the second vertex by one of the edges is not to be included in a maximal independent set for the undirected graph, and an indication that the second vertex is to be included in the maximal independent set for the undirected graph. At least one of the determinations and the recordings may be performed asynchronously and in parallel.

In any of the disclosed embodiments, recording the indication that the first vertex is to be included in the maximal independent set for the undirected graph may be performed subsequent to recording the respective indications that each neighbor vertex connected to the first vertex by one of the edges is not to be included in a maximal independent set for the undirected graph. When executed by the processor, the instructions may further cause the processor to perform determining that the vertices in the first plurality of vertices have an undecided status, and determining, for each vertex in a first plurality of vertices in the undirected graph, that no neighbor vertex connected to the vertex by one of the edges in the undirected graph has a priority value that is higher than the initial priority value for the vertex may be performed in response to the determination that the vertices in the first plurality of vertices have an undecided status.

In any of the disclosed embodiments, generating the respective initial priority value for each vertex may include obtaining the average degree for vertices in the undirected graph, adding the vertex degree to the average degree for vertices in the undirected graph to produce a sum, and dividing the average degree for vertices in the undirected graph by the sum to produce the respective initial priority value.

In any of the disclosed embodiments, generating the respective initial priority value for each vertex may include obtaining the average degree for vertices in the undirected graph, generating a random number dependent on a unique identifier of the vertex, subtracting the random number from the degree of the vertex to produce a modified vertex degree, adding the modified vertex degree to the average degree for vertices in the undirected graph to produce a sum, and dividing the average degree for vertices in the undirected graph by the sum to produce the respective initial priority value.

In another aspect, a disclosed system may include a processor comprising a plurality of processing elements, and a memory coupled to the processor. The memory may store program instructions that when executed by the processor cause the processor to access data representing an undirected graph, the undirected graph including vertices and edges, each edge connecting a respective pair of vertices, generate a respective initial priority value for each vertex, the initial priority being dependent on the degree of the vertex and on an average degree for vertices in the undirected graph, record an indication of the respective initial priority value for each vertex in a memory, determine, for each vertex in a first plurality of vertices in the undirected graph, dependent on the indications recorded in the memory, that no neighbor vertex connected to the vertex by one of the edges in the undirected graph has a priority value that is higher than the initial priority value for the vertex, record, in the memory in response to a determination that no neighbor vertex connected to a first one of the first plurality of vertices by one of the edges has a priority value that is higher than the initial priority value for the first vertex, respective indications that each neighbor vertex connected to the first vertex by one of the edges is not to be included in a maximal independent set for the undirected graph, and an indication that the first vertex is to be included in the maximal independent set for the undirected graph. When executed by the processor, the instructions may further cause the processor to determine, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices, the determination being performed for the vertex in the second plurality of vertices in parallel with the determinations being performed for the first plurality of vertices, and in response to the determination that a neighbor vertex connected to the vertex in the second plurality of vertices by one of the edges in the undirected graph has a priority value that is higher than the initial priority value for the vertex in the second plurality of vertices, refrain from recording data representing a status for the vertex in the second plurality of vertices in the respective data structure associated with the vertex in the second plurality of vertices, and refrain from determining whether an additional neighbor vertex connected to the vertex in the second plurality of vertices by one of the edges in the undirected graph has a priority value that is higher than the initial priority value for the vertex in the second plurality of vertices.

In any of the disclosed embodiments, for each vertex in the undirected graph, to record an indication of the respective initial priority value for the vertex, the processor may record, in a data structure associated with the vertex, a value that simultaneously represents an indication of an undecided status for the vertex and the respective initial priority value for the vertex, to record a respective indication that each neighbor vertex connected to the vertex by one of the edges is not to be included in a maximal independent set for the undirected graph, the processor may store, in a respective data structure associated with the neighbor vertex, a first designated priority value that represents an indication of an out status for the neighbor vertex, to record an indication that the vertex is to be included in the maximal independent set for the undirected graph, the processor may store, in the data structure associated with the vertex, a second designated priority value that represents an in status for the vertex, and the value that simultaneously represents an indication of an undecided status for the vertex and the respective initial priority value for the vertex may be a value other than the first designated priority value or the second designated priority value.

In any of the disclosed embodiments, data representing the data structure associated with the vertex may be stored in a single byte in the memory.

In any of the disclosed embodiments, the processor may record the indication that the first vertex is to be included in the maximal independent set for the undirected graph subsequent to recording the respective indications that each neighbor vertex connected to the first vertex by one of the edges is not to be included in a maximal independent set for the undirected graph. When executed by the processor, the instructions may further cause the processor to determine that the vertices in the first plurality of vertices have an undecided status, and the processor may determine, for each vertex in a first plurality of vertices in the undirected graph, that no neighbor vertex connected to the vertex by one of the edges in the undirected graph has a priority value that is higher than the initial priority value for the vertex may be performed in response to the determination that the vertices in the first plurality of vertices have an undecided status.

In any of the disclosed embodiments, to generate the respective initial priority value for each vertex, the processor may obtain the average degree for vertices in the undirected graph, add the vertex degree to the average degree for vertices in the undirected graph to produce a sum, and divide the average degree for vertices in the undirected graph by the sum to produce the respective initial priority value.

In any of the disclosed embodiments, to generate the respective initial priority value for each vertex, the processor may obtain the average degree for vertices in the undirected graph, generate a random number dependent on a unique identifier of the vertex, subtract the random number from the degree of the vertex to produce a modified vertex degree, add the modified vertex degree to the average degree for vertices in the undirected graph to produce a sum, and divide the average degree for vertices in the undirected graph by the sum to produce the respective initial priority value.

In any of the disclosed embodiments, the processor may be a CPU or a graphics processor (GPU) comprising a plurality of processing elements, and at least one of the determinations and the recordings may be performed asynchronously and in parallel by respective ones of the plurality of processing elements.

BRIEF DESCRIPTION OF THE DRAWINGS

Embodiments of the present disclosure may be better understood through reference to the following figures in which.

DETAILED DESCRIPTION OF PARTICULAR EMBODIMENT(S)

Figure 1:
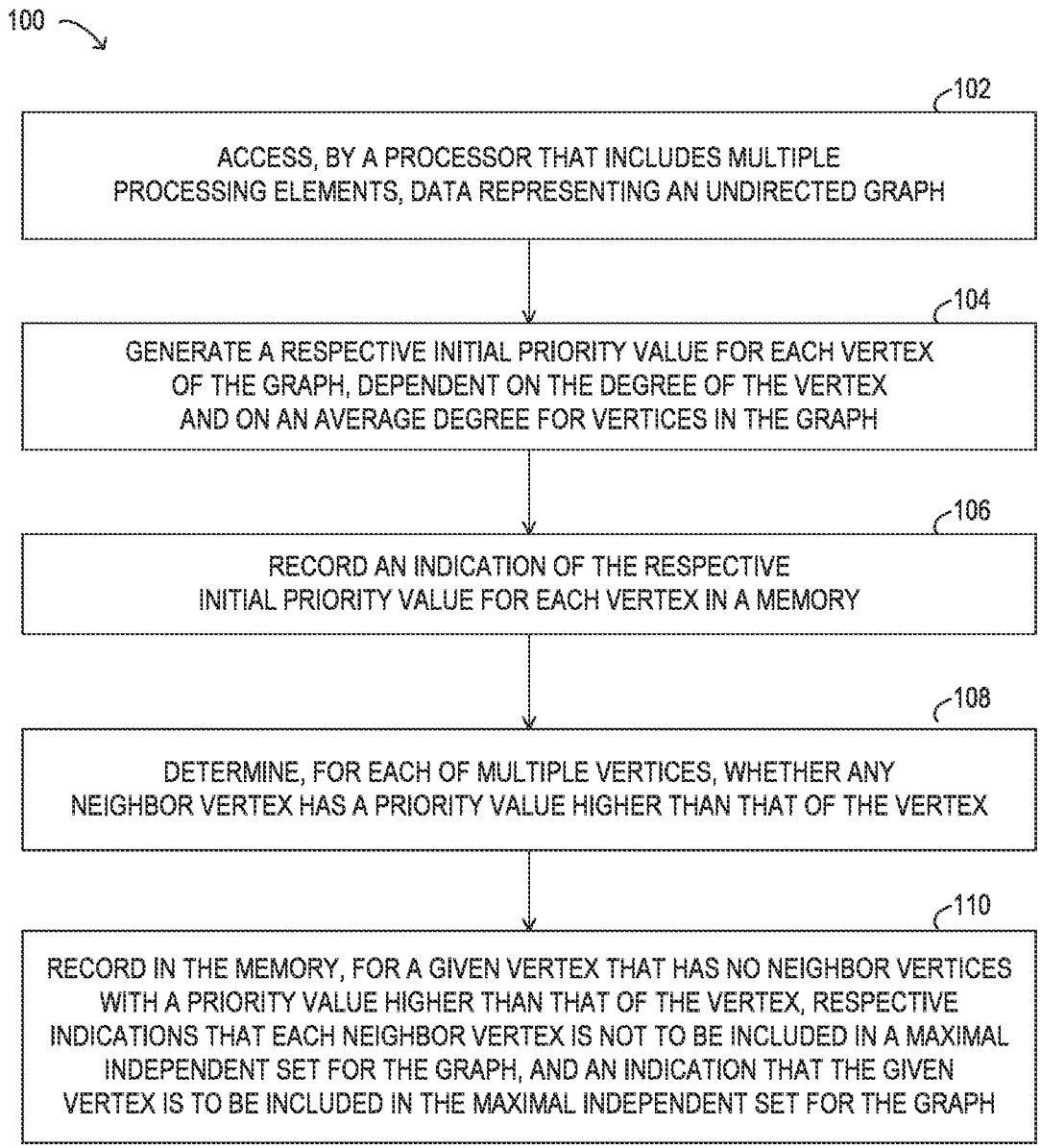
FIG. 1 is a flow diagram illustrating selected elements of a method for identifying a maximal independent set, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments. For a more complete understanding of the present disclosure, reference is made to the following description and accompanying drawings.

The present disclosure relates to systems and methods for identifying one or more maximal independent sets for a given graph. A maximal independent set (MIS) of an undirected graph is a subset of its vertices in which none of the vertices in the set are adjacent to each other and in which all remaining vertices in the graph are adjacent to at least one vertex in the independent set. In some cases, when computing an MIS of a graph, it may be important that the maximal independent set it produces is as large as possible. It may also be desirable that the runtime of the computation is as short as possible. A high-quality and fast MIS computation may have the potential to substantially speed up and improve not only the generation of the MIS itself, but also other computations, including parallel computations, that use MIS computations as a building block. In some embodiments, the maximal independent sets may be identified using parallel computations performed by multiple processors or processing elements. For example, in some embodiments, they may be identified using parallel computations performed by multiple processing elements of a graphics processor (GPU).

In some embodiments of the present disclosure, MIS computations may be employed to parallelize computations that have arbitrary and dynamically changing conflicts. For example, a system that supports parallel computations may employ MIS computations as follows. First, the current conflicts may be established and recorded in a conflict graph (sometimes referred to as an interference graph) in which the vertices represent the computations and the edges represent the conflicts. An MIS may then be computed for the conflict graph. The computations that correspond to the vertices in the MIS may be performed in parallel, after which those vertices may be removed from the conflict graph. These steps, which may collectively be referred to as a round, may be repeated until all computations have been processed. By definition, this approach results in only independent work being executed concurrently. Moreover, it exposes a maximal number of computations to be executed in each round. Note that the alternative, i.e., parallelizing such computations using locks, can be expensive due to the locking overhead, whereas the above approach is lock free. Since the MIS algorithm is useful for parallelizing computations that have complex conflict patterns, a fast and high-quality parallel MIS computation may be especially beneficial in a future dominated by massively-parallel devices.

Computing an MIS for a graph sequentially is relatively straightforward. For example, computing an MIS sequentially may include marking all of the vertices in a graph G=(V, E), where V represents the set of vertices in the graph and E represents the set of edges in the graph, as "undecided" and then visiting them in any order. If a visited vertex is still undecided, it is marked as belonging to the MIS and all of its neighbors are marked as not belonging to the MIS. If a visited vertex is already decided, it is skipped. This computation runs in O(n) time, where n=|V|, assuming an undirected graph without loops (i.e., self-edges) and without multiple edges between the same two vertices. Undirected graphs of this type are assumed in the discussions that follow.

When applying one of the first approaches for identifying an MIS for a graph using parallel computing, the computation runs in $O(\log^4 n)$ time on $O(n^2)$ processors. As shown by the example pseudo code below, at a high level, this computation includes a loop calculation of an independent set I of a graph G in which each iteration of the loop is a synchronous round, H is the remaining portion of the graph that still needs to be processed, S is an independent set of a subgraph in H, and N(S) denotes the neighbors of the vertices in S. While H is non-zero, the computation identifies an independent set S of a subgraph in H, merges it with the previously identified I, and removes subgraph S and its neighbors from H. Under this approach, the ease with which the independent sets of various subgraphs in H can be computed in parallel is dependent on the determination of suitable subgraphs.

1 I←∅
2 H←G
3 while H≠∅ {
4 S←independent set of subgraph in H
5 I←I∪S
6 H←H−(S∪N(S))
7}

Others early approaches to MIS generation using parallel computations use O(m) processors to calculate an MIS in $O(\log^2 n)$ time where m is the number of edges in the graph. These computations follow the high-level approach shown in the pseudo code above but employ different subgraph extraction schemes. One of these computations performs the following operations in each round:

1) Copy H into S.
2) Assign a respective random number to all vertices in S.
3) Check all edges in S. For each edge, mark the endpoint vertex that was assigned the higher random number as deleted (not in S). Break ties, if needed, e.g., using unique vertex identifiers.

In this computation, all of the steps above can be executed using parallel computing, e.g., by different processors, processing elements of a GPU, cores of a multi-core processor, or threads of execution on a multi-threaded processor or GPU. While this computation is guaranteed to result in an independent set of (non-deleted) vertices in S, this set is generally not maximal. Therefore, the computation may be repeated in multiple synchronous rounds, where the output of one round is the input to the next round, until the independent set S cannot be made any larger.

Several different approaches to identifying an independent subgraph in H have been described in the literature, including a random-priority parallel MIS approach, a random-selection parallel MIS approach, and a random-permutation parallel MIS approach, all of which use probabilistic means. The example computation described above employs a random-priority parallel MIS approach.

A computation that employs a random-selection parallel MIS approach uses random numbers to select vertices with probability 1/(2d(v)), where d(v) is the degree of vertex v. For all edges whose two end points are both selected, the one with the lower degree is deselected, and ties are broken using, e.g., unique vertex IDs. Under this approach, lower-degree vertices are selected with higher probability for inclusion in the MIS. Since low-degree vertices have few neighbors than high-degree vertices, including these vertices disqualifies few other vertices (its neighbors) from inclusion, thus increasing the chance of finding a larger MIS.

A computation that employs a random-permutation parallel MIS approach operates in a manner similar to that of the random-priority parallel MIS approach described above. However, it does not assign new random numbers in each round but reuses the previously assigned numbers. In other words, the computation assigns random numbers only once, which has the effect of selecting a random permutation of all the vertices in the original graph. The resulting parallel computation runs in $O(\log^2 n)$ time, and, based on the chosen permutation, produces the same result as a corresponding serial computation.

The random-selection approach generates larger maximal independent sets than the random-permutation approach, on average, but the random-permutation approach generates deterministic output. That is, when executing computations that employ random-permutation approach, a given input always produces the same output. In a computation that employs a random-priority or random-permutation approach, a random number between 0 and 1 is assigned to each vertex and the vertex to which the higher value is assigned is selected for inclusion in the MIS. A computation that employs a random-selection approach generates a random number in a range between 0 and ½d(v) for each vertex based on the degree of the vertex, d(v).

The following three-vertex graph, where the values in parentheses indicate the random numbers assigned to each vertex, illustrates why, in computations using any of the parallel MIS approaches described above, multiple rounds may be necessary.

w(3)-u(4)-v(7)

For this example graph, depending on the timing of the parallel execution, vertex u may temporarily prevent vertex v from being included in the MIS. For example, the random number assigned to vertex u has a lower value than that of the random number assigned to vertex v. However, vertex u has another neighbor, vertex w, which has been assigned a random number with an even lower value. In this example, adding vertex w to the MIS will result in all of its neighbors, including vertex u, being dropped from the MIS. This, in turn, causes the value of the random number assigned to vertex v be the lowest, thus allowing vertex v to join the MIS. Since the neighbors of vertex v might have been checked before vertex u was dropped from the MIS, vertex v will have to check the values of the random numbers assigned to its neighbors again in the next round.

In some embodiments of the present disclosure, a fast and high-quality parallel MIS computation for massively-parallel devices may employ an approach similar to that of the random-permutation parallel MIS approach described above, but may run faster and/or produce larger maximal independent sets than previous parallel MIS computations. For example, in some embodiments, this approach, which is referred to herein as the "BD-MIS" approach, may distribute random numbers among the vertices of a graph in a manner that results in the identification of larger maximal independent sets than other approaches. More specifically, a BD-MIS computation may employ a partially randomized priority-assignment function that is likely to produce larger maximal independent sets than existing approaches without negatively affecting the speed of the computation. This priority-assignment function is described in more detail below. In some embodiments, a BD-MIS computation may implement GPU-friendly optimizations over existing approaches. For example, a BD-MIS computation may create and exploit monotonicity to minimize its memory footprint, eliminate synchronization, and maximize performance. The resulting asynchronous approach may be deterministic and may be implemented using a relatively small number of kernel statements.

As noted above, BD-MIS is based on a random-permutation parallel MIS algorithm. In at least some embodiments, a BD-MIS computation may utilize a compressed sparse row (CSR) data structure for representing the graph. In some embodiments, the BD-MIS computation may operate directly on the CSR data structure, rather than using library calls.

While many, if not most, MIS implementations assign a uniformly distributed random number to each vertex, a BD-MIS computation employs a distribution that improves the quality of the solution for a wide range of graphs. As noted above, computations that employ the random-permutation parallel MIS algorithm only generate the random numbers once. The BD-MIS approach takes advantage of this fact to make the implementation monotonic. In some embodiments, this monotonicity may be exploited to reduce the memory footprint of the BD-MIS computation and to make the implementation asynchronous. For example, in some embodiments of the present disclosure, it may be possible to implement multiple rounds of a BD-MIS computation in an asynchronous manner. In one such example, executing the computation in an asynchronous manner on a multi-threaded processor or GPU may allow an execution thread to retry its vertices before the other threads have finished their work, which may reduce waiting at the cost of possibly performing redundant work. In some embodiments, operating a BD-MIS computation asynchronously may boost its performance and minimize bus transfers between a processor that requested the computation and a processor that executed the computation.

In some embodiments of the present disclosure if, in BD-MIS computation, two adjacent vertices are assigned the same random number, their unique vertex identifiers (IDs) may be used to break the tie. Conceptually, this approach concatenates the random numbers assigned to the vertices with their vertex IDs to form unique random numbers. Such concatenated values may be assumed to simplify the discussions that follow.

In BD-MIS computations, the assigned random numbers impose a unique ordering on the vertices, i.e., they select a specific permutation, which should run in no more than $O(\log^2 n)$ rounds with high probability. As previously noted, any serial or parallel execution that adheres to a given permutation always yields the same MIS, that is, the result of the BD-MIS computation is deterministic regardless of the internal timing behavior of its parallel execution.

In some embodiments of the present disclosure, within a BD-MIS computation, a higher random number may signify a higher-priority vertex.

The following example pseudo code illustrates a baseline implementation of an MIS computation that employs a random-permutation parallel MIS approach. As in many parallel MIS implementations, this implementation maintain two pieces of information per vertex: a random number and a status indicator. In this implementation, each vertex can be in one of three states: "undecided", "in" (i.e., in the MIS), or "out" (i.e., not in the MIS). The random number associated with each vertex, which represents its priority, is stored in a separate field. In this example, it may be assumed that the kernels run with k threads, each of which has a unique thread ID tid$\in \mathbb{N}$, 0≤tid≤k. As in other examples, n represents the number of vertices in the graph. All undeclared variables are shared and global.

```
1    void init_kernel( ) {
2        random[n] = ...; //initialize random priorities for each vertex
3        status[n] = ...; // initialize the status of each vertex as
         "undecided"
4        need_another_round = false;
5    }
6    void compute_kernel( ) {
7        for (int v = tid; v < n; v += k) {
8            if (status[v] == undecided) {
9                int rnd = get_best_neighbor(v);
10               if (random[v] > rnd) {
11                   status[v] = in;
12                   mark_neighbors_out(v);
13               } else {
14                   need_another_round = true;
15               }
16           }
17       }
18   }
19   bool work_remains( ) {
20       bool wr = ...; //get need_another_round
21       //set need_another_round to false
22       return wr;
23   }
24   void MIS( ) {
25       //allocate memory and transfer graph
26       init_kernel( );
27       do {
28           compute_kernel( );
29       } while (work_remains( ));
30   }
```

In this example, the computation first assigns the random priorities of each vertex (at line 2) and sets the status of each vertex to "undecided" (at line 3). After this initialization, the computation repeatedly calls the compute kernel until no undecided vertices are left. In each round, the vertices are assigned to respective threads in a cyclic fashion (at line 7). When executing on a GPU, this may enable coalesced (fast) memory accesses. The desire to enable coalesced (fast) memory accesses may also be the reason that the random numbers and the status information for the vertices are kept in two separate scalar arrays. If (at line 8) the current vertex is still undecided, its neighbors may be visited to find the vertex that is associated with the highest priority (at line 9). This search excludes all neighbors that have already been determined to be "out" of the independent set. If (at line 10) it is determined that the priority associated with the current vertex is higher than the priorities associated with its neighbors, the status indicator associated with the current vertex may be set to a value indicating that it is "in" the MIS (at line 11), and the respective status indicators associated with each of its neighbors may be set to a value indicating that they are "out" (at line 12). Otherwise (at line 14), the status of the current vertex cannot yet be determined and another round might be needed.

In at least some embodiments of the present disclosure that employ a random-permutation parallel MIS approach, the status of a vertex at any given point may be "undecided", "in", or "out". Each vertex is initially "undecided" and changes its status exactly once to either "in" or "out". Once its status has been determined as "in" or "out", it will not change again. However, it is possible for a vertex to redundantly be marked as "out" by multiple threads. Only threads operating visiting a vertex that is "in" ever update the status array.

Computations that employ the random-priority and random-permutation parallel MIS approaches assign a uniformly distributed random number to each vertex. In contrast, computations that employ the random-selection parallel MIS approach select vertices with probability $1/(2d(v))$, where $d(v)$ is the degree of vertex v. As noted above, this assignment may increase the chance of identifying a larger MIS when compared to other assignment approaches.

In at least some embodiments of the present disclosure, a BD-MIS computation may employ an alternative permutation to boost the independent set size. In some embodiments, the chosen permutation approach may be run in $O(1)$ time per vertex. In such embodiments, the priority assignment cannot be dependent on information such as the maximum vertex degree because this information is not readily available in the CSR graph representation. However, in some embodiments of the BD-MIS computation, the priority assignment may be based on the degree of a vertex and/or the average degree, both of which can be obtained in constant time.

In some embodiments, priorities may be assigned in the range between zero and one. Subsequently, the assigned priorities may be scaled and offset to the ultimately desired range, as described later. Unlike under the random-selection approach, which only prefers low-degree vertices by selecting them with higher probability, under the BD-MIS approach, lower-degree vertices may always be given higher priority. For example, in some embodiments that employ BD-MIS, the priority-assignment function may monotonically decrease for higher degrees. Since zero-degree vertices can (trivially) be included in the MIS, the priority-assignment function may assign the highest priority to vertices of degree one. Vertices with multiple neighbors may receive lower, but still positive, priorities. To spread out the priorities irrespective of how dense the graph is (i.e., irrespective of the average degree), the priority-assignment function may map all vertices having below average degrees to the upper half of the priority range and the rest of the vertices to the lower half of the priority range. One example of such a priority-assignment function is illustrated below as function (1).

$$f(x)=avg/(avg+x), \text{ where } x=d(v) \qquad (1)$$

In this example priority-assignment function, the term "avg" refers to the average degree (i.e., the number of edges divided by the number of vertices in the graph), and $d(v)$ denotes the degree of vertex v.

In some embodiments of the present disclosure, e.g., in order to accommodate graphs that include many vertices with the same degree (which is common for some graph types, such as road maps), randomization may be added to the priority-assignment function. To incorporate randomization without altering the priority imposed by the vertex degree, a random number in the range $(0, 1]$ may be subtracted from the degree of each vertex. In some embodiments, the use of the priority-assignment function shown as function (1) above, which does not include such randomization, may increase the independent set size when compared to existing approaches. In some embodiments, the introduction of such randomization may decrease the runtime of the BD-MIS computation without significantly affecting the independent set size. One example of a partially randomized priority-assignment function for BD-MIS is illustrated below as function (2).

$$f(x)=avg/(avg+x), \text{ where } x=d(v)-rand(id(v)) \qquad (2)$$

In this example partially randomized priority-assignment function, $id(v)$ represents the unique identifier of vertex v, and $rand(z)$ deterministically maps the integer z to a random floating-point value between zero and one but not including one. In some embodiments, using the vertex ID as a random number seed guarantees that function (2) always produces the same priority for a given vertex of a given graph and therefore the same permutation of the vertices. In some such embodiments, this priority-assignment function, in turn, makes the BD-MIS computation as a whole deterministic. In other embodiments, this partially randomized priority-assignment function may be applied in MIS computations other than those that employ the BD-MID approach, and its use may increase the size of the independent sets they identify. In these other embodiments, the partially randomized priority-assignment function may be executed up front to initialize the vertex priorities, and may not affect the remaining portions of the MIS computation.

A plot of priority assignment as a function of the vertex degree (as in the priority-assignment functions (1) and (2) above) for the lowest and highest random values may show the lowest possible function value, which occurs when the random number is zero, and an upper bound for the highest possible value, which occurs when the random number is one. Whereas the function values depend on the average degree (avg), different average degrees may stretch or contract the function "horizontally" such that the lowest value at f(avg) is always 0.5. Together, the ranges between the lowest and highest values for the integer vertex degrees 1 through $\infty$ may form a partition. In other words, they may not overlap and they may cover the entire range $[0, 1)$. In an example in which avg=5.1, all vertices with degree one may be assigned a priority between 0.84 and 1.0, all vertices with degree two may be assigned a priority between 0.72 and 0.84, and so on. In practice, the range between zero and f(max+1), where max is the largest occurring degree, remains unused. However, it may be assumed that max is not available, in which case the function cannot just be stretched "vertically" to eliminate this gap. In at least some embodiments, max may be bounded by the number of vertices in the graph. However, that number may be too large to make a difference. For example, for a graph with one million vertices, the guaranteed unused range is 0.0005%, which may simply be ignored. Nevertheless, a small actual max value may result in a significant unused range, but only if max is close to avg. In the worst case, in which avg and max are equal, half of the function range cannot be reached.

To obtain an integer priority, the function value may be multiplied by the largest desirable priority and the result may be rounded to the nearest integer. Due to the nature of the priority-assignment function, this discretization may yield a larger number of possible priorities for lower-degree vertices than for higher-degree vertices, which may be significant when only a small range of integer priorities is available. After all, the randomization is primarily used to permute the low-degree vertices relative to each other, as they have a high chance of being included in the MIS. In contrast, a failure to permute the high-degree vertices in a meaningful way is unlikely to negatively affect the MIS quality, as those vertices have a low probability of being included in the MIS. In at least some embodiments of the present disclosure, the BD-MIS priority-assignment functions described above may not only prioritize lower-degree vertices but may also make it possible to use a narrow range of integers for representing the priorities. In other words, a small integer type may be used to store the priorities without negatively affecting the resulting solution quality, in some embodiments. In such embodiments, the memory footprint for storing the priorities may be substantially reduced (e.g., by a factor of four in the case that it is reduced from an int type to a char type). This may also lower the memory bandwidth requirement and improve in-cache presence, the latter of which may be particularly beneficial when implementing BD-MIS on GPUs, which tend to have relatively small caches.

In some MIS implementations, it is typical for at least one byte to be allocated per vertex to hold the status information. The random number associated with each vertex, which represents its priority, is typically stored in a separate field that is an integer (e.g., four bytes). This arrangement not only results in a significant memory footprint but also requires two memory accesses to read or write the information associated with each vertex. In some embodiments, a BD-MIS computation may employ a technique to combine these two pieces of information into a single, small word to boost performance, simplify the implementation, and make the code asynchronous. Note that combining the status and priority in a single word is compatible with the property of the priority-assignment function, discussed above, that enables the use of small word sizes for storing the priorities.

In some embodiments, three properties of the BD-MIS approach may be exploited by a technique to combine the status and priority information. First, the status of all vertices may initially be marked as "undecided" and may switch to either "in" or "out" exactly once during the computation. This represents a form of monotonicity, in that the status moves in a specific direction and never back. Second, in the random-permutation parallel MIS approach, the random numbers do not change during the course of the execution and are only used while a vertex is "undecided". Third, only threads processing an "in" vertex update the status information. More specifically, such thread update the status of the current vertex and its neighbors.

In a BD-MIS computation, the priority of each vertex may be denoted by a random number. In some embodiments of the present disclosure, the highest priority value may be reserved to indicate an "in" status. Similarly, the lowest priority value may be reserved to denote an "out" status. This may be accomplished by scaling and offsetting the initial priority assignment to ensure that "undecided" vertices never receive either the highest or the lowest priority. As a result, the status and the priority of a vertex may be expressed in a single word in which the lowest value represents a status of "out", the highest value represents a status of "in", and all values in between represent a status of "undecided" and simultaneously provide the priority. This assignment approach may reduce the memory footprint of a BD-MIS computation and the number of memory accesses it performs. In some embodiments, this assignment approach may also makes the BD-MIS code simpler. In some embodiments, this assignment approach may make it straightforward to implement a BD-MIS computation in an asynchronous manner.

In some embodiments, since the initial priority value may no longer be needed once a vertex's status has been determined, it may be safe to overwrite and lose this information. However, doing so must not invalidate any prior, ongoing, or future decisions the BD-MIS computation (or a program containing the BD-MIS computation) makes. For example, the computation may only change the status of a vertex to "in" if the vertex has the highest priority among all of its neighbors. Since a vertex that has the status "in" is assigned the highest overall priority value, overwriting the initial priority value of a vertex v with the priority value that represents a status of "in" does not change anything as far as its neighboring vertices are concerned. Those vertices still have a neighbor with a higher priority. In some embodiments, it may not matter when those vertices see that the priority of vertex v has been updated to "in". They will determine that they are not the highest priority vertex independent of whether they see the priority of vertex v as undecided or as its determined "in" status. Note that writing machine words and bytes is naturally atomic. Hence, the status of vertex v can be safely updated to "in" in an asynchronous fashion (i.e., at an arbitrary time). The neighboring vertices will either see the old value or the new value, but never a partially updated value.

In some embodiments, changing the status of a vertex to "out" may proceed in an analogous manner and may also be atomic. For example, only vertices that are guaranteed to have a higher-priority neighbor can potentially have their priority lowered to "out". Moreover, any thread processing a vertex with a higher-priority neighbor will not update the status of any vertex. Hence, it may not matter exactly when a thread observes this lowering in priority of its vertex, which can therefore also be performed asynchronously. In some embodiments, vertices having the status "out" may not be able to prevent any of their neighbors from joining the MIS. This may be achieved by assigning the lowest overall priority value to represent a status of "out". In fact, determining that a vertex is "out" may allow other vertices to be "in" that previously had a neighbor with a higher priority. In some embodiments, the combination of the status and priority values in the same data element may maintain this behavior and, together with the used of atomic writes, may eliminate any need for synchronization as long as the neighboring vertices eventually see that the priority value represents the status "out".

In some embodiments in which the BD-MIS computation is executing on a multi-threaded processor or GPU, due to the above-mentioned monotonicity, a thread may simply terminate once the status of all vertices assigned to it has been decided. In some embodiments, the resulting computation may perform a chaotic relaxation in which threads repeatedly try to determine the status of their vertices until they are either "in" or "out". Forward progress, and therefore termination, may be guaranteed as either all vertices are decided or there is one undecided vertex with the globally highest non-"in" priority (e.g., due to a tie breaker) that can unequivocally be determined to be "in. In at least some embodiments, a BD-MIS computation may employ a persistent-thread implementation in which the threads process the vertices assigned to them in a round-robin fashion, thus guaranteeing that this highest non-"in" priority vertex is eventually processed.

In some embodiments, a BD-MIS computation may require only two kernel invocations, and a single combined status/priority indicator per vertex. It may not require any explicit synchronization primitives, and may not require that any termination information is sent back to the CPU or other processing element that invoked it. In some embodiments, a BD-MIS computation that includes a single combined status/priority indicator per vertex may be deterministic. In some embodiments, a BD-MIS computation that includes a single combined status/priority indicator per vertex may be faster than one that includes separate status and priority indicators because it uses less memory (which improves locality), reduces the number of executed instructions (e.g., fewer memory accesses, synchronization operations, and comparisons are performed since the status and priority checks are combined), minimizes bus transfers, and reduces waiting (since there are no barriers between rounds).

In some embodiments, the BD-MID computation spends most of its execution time determining whether or not the status of a vertex is still undecided (at line 8, in the example above). In some embodiments, this test may require two comparisons because there are two decided states, "in" and "out" that are separated by many "undecided" states. In some embodiments, in order to speed up this determination without breaking any of the other optimizations described herein, even values may be used to represent "in" and "out" and only odd values that lie between the values representing "in" and "out" may be assigned as priority values. As a consequence, determining whether or not a vertex has been decided may simply involve determining whether or not its combined status/priority value is even. This approach may effectively make the least significant bit (LSB) of the combined status/priority indicator a flag that indicates whether or not a vertex has been decided. If the LSB is zero (even), the vertex is decided and the remaining bits may indicate whether it is "in" or "out". If the LSB is one (odd), the remaining bits may specify the priority. Note that using any bit other than the LSB may break the condition of "out" being represented by the lowest priority value and "in" being represented by the highest value, while still being able to use the full range of the remaining bits for specifying priorities.

In some embodiments of the present disclosure, a BD-MIS computation may include one or more additional optimizations over the baseline MIS implementation illustrated above. For example, in some embodiments, it may not be necessary to search for the neighbor with the highest priority (as in line 9 in the baseline implementation). This is because the subsequent test (at line 10) only needs to determine whether any neighbor with a higher priority exists. By contrast, in some embodiments of the BD-MIS computation, as soon as any neighbor with a higher priority is found, the search can be terminated and the remaining neighbors do not have to be visited.

Another optimization implemented in some embodiments of the BD-MIS computation is to have any thread processing an "in" vertex mark all the neighbors as "out" (as in line 12 in the baseline implementation) before setting the status of the current vertex to "in" (as in line 11 in the baseline implementation). This may improve performance because while changing the status of a vertex to "in" does not affect any other thread, changing the status of a vertex to "out" might enable the status of another vertex to be determined. Therefore, in some embodiments, status updates that move the status of a vertex to "out" may be propagated right away whereas status updates that move the status of a vertex to "in" may be allowed to propagate lazily.

Some transformations to the baseline MIS implementation shown above that may be included in a BD-MIS computation might not improve performance. For example, since the code itself performs very few computations and spends most of its time traversing the graph, it is memory bound. Therefore, any optimizations that increase memory accesses or decrease coalescing opportunities generally hurt performance. In some embodiments, instead of going from tid to n in each round (as in line 7 in the baseline implementation), these bounds may be narrowed to skip vertices at the beginning and/or at the end of that range that have already been decided in prior rounds. However, doing so may require at least one additional array to record this information, and may increase the number of memory accesses. Moreover, selectively changing the starting point for some threads in a warp may result in loss of coalescing when accessing the status array (at line 8).

The following pseudo code illustrates an example BD-MIS computation that includes many of the above-mentioned enhancements and optimizations. As in the previous example, undeclared variables are global and shared.

```
1    void init_kernel( ) {
2        statprio[n] = ...; // initialize the combined status/priority
         using f(x)
3    }
4    void compute_kernel( ) {
5        bool done;
6        do {
7            done = true;
8            for (int v = tid; v < n; v += k) {
9                if (statprio[v] & 1) {
10                   if (best_among_neighbors(v)) {
11                       mark_neighbors_out(v);
12                       statprio[v] = in;
13                   } else {
14                       done = false;
15                   }
16               }
17           }
18       } while (!done);
19   }
20   void MIS( ) {
21       init_kernel( );
22       compute_kernel( );
23   }
```

In this example, there is only a single combined status/priority indictor (the statprio array) rather than separate status and priority arrays. Moreover, the statprio array is an array of bytes (unsigned characters) rather than four-byte integers. This array may be initialized (at line 2) using function (1) or function (2) above to boost the size of the resulting MIS (i.e., to enhance the quality of the solution). In this example, only odd priorities that lie between the even values denoting "in" and "out" are assigned to vertices that have at least one neighbor. Vertices without neighbors may be initialized to "in".

In this example, the compute kernel is only called once and no data is transferred over the bus to indicate whether or not the kernel needs to be called again. Instead, each thread uses a local variable (at line 5) to track whether it has completed its work and can terminate (at line 18). In each iteration of the do loop, a thread traverses all of its cyclically assigned vertices (at line 8) and performs (at line 9) a quick check to determine whether a vertex is still undecided, i.e., odd. If so, it determines whether the current vertex has the highest priority among its neighbors, using the unique vertex IDs as tie breaker if necessary (at line 10). In at least some embodiments, this test may use a short-circuit evaluation. In other words, it may stop as soon as any higher-priority neighbor is found rather than identifying the actual highest-priority neighbor. If the current vertex has the highest priority, it first marks all of its neighbors as "out" (at line 11) before marking itself as being "in" the MIS (at line 12). Otherwise, the status of the current vertex cannot be determined and it will be revisited later (at line 14). The final result of the MIS computation is returned in the statprio array.

FIG. 1 is a flow diagram illustrating selected elements of a method 100 for identifying a maximal independent set, in accordance with some embodiments of the present disclosure. Method 100 may be implemented by any of the elements shown in FIG. 4. In some embodiments, method 100 may be implemented by hardware circuitry, which may include any suitable combination of static (fixed-function), dynamic, and/or programmable logic devices. In other embodiments, one or more of the operations of method 100 may be performed or emulated by the execution of program instructions by a processor that includes multiple processing elements. In one embodiment, one or more of the operations of method 100 may be performed by the execution of program instructions by a GPU. Method 100 may be initiated by any suitable criteria and may initiate operation at any suitable point. In one embodiment, method 100 may initiate operation at 102. Method 100 may include greater or fewer operations than those illustrated. Moreover, method 100 may execute its operations in an order different than those illustrated in FIG. 1. Method 100 may terminate at any suitable operation. Moreover, method 100 may repeat operation at any suitable operation. Method 100 may perform any of its operations in parallel with other operations of method 100, or in parallel with operations of other methods. Furthermore, method 100 may be executed multiple times to perform at least a portion of a BD-MIS computation. During the execution of method 100, other methods may be invoked to perform at least some of the operations of method 100.

As illustrated in FIG. 1, method 100 may include (at 102) accessing, by a processor that includes multiple processing elements, data representing an undirected graph. For example, the data may be stored in a memory, and the method may include accessing the data using memory accesses. In some embodiments, the undirected graph may be a dependence graph. Method 100 may include (at 104) generating a respective initial priority value for each vertex of the graph. In at least some embodiments, the initial priority value for each vertex may be dependent on the degree of the vertex and on an average degree for vertices in the graph. The average degree for the vertices in the graph may be computed in any of a variety of ways, in different embodiments, including, but not limited to, by computing an arithmetic mean, by computing a geometric mean, or by computing a harmonic mean. In one embodiment, the initial priority value may be generated in accordance with priority-assignment function (1) shown above. In another embodiment, the initial priority value may be generated in accordance with priority-assignment function (2) shown above. Other priority-assignment functions are possible, in other embodiments. Method 100 may also include (at 106) recording an indication of the respective initial priority value for each vertex in a memory. For example, in some embodiments, recording the initial priority value may include storing the priority value in an array of priority values, each element of which is associated with one of the vertices in the undirected graph. In other embodiments, recording the initial priority value may include storing the priority value in an array of data structures, each of which is associated with one of the vertices in the undirected graph, and each of which stores data representing a priority value and/or a status indicator at different times, as described herein.

Method 100 may include (at 108) determining, for each of multiple vertices, whether any neighbor vertex has a priority value that is higher than the initial priority value of the vertex. For example, the method may include visiting one or more of the neighbors of each vertex to determine its current priority value, which may include accessing the respective elements of an array of priority values, each element of which is associated with one of the vertices in the undirected graph. In other embodiments, visiting one or more of the neighbors of each vertex to determine its current priority value may include accessing a respective data structure that is associated with each of the vertices in the undirected graph and that stores data representing a priority value and/or a status indicator, as described herein.

Method 100 may also include (at 110) recording in the memory, for a given vertex that has no neighbor vertices with a priority value that is higher than that of the vertex, respective indications that each neighbor vertex is not to be included in a maximal independent set for the graph, and an indication that the given vertex is to be included in the maximal independent set for the graph. In some embodiments, recording the respective indications that each neighbor vertex is not to be included in a maximal independent set for the graph may include storing the indications in an array of status indicators, each element of which is associated with one of the vertices in the undirected graph. In other embodiments, recording the respective indications that each neighbor vertex is not to be included in a maximal independent set for the graph may include storing the indications in an array of data structures, each of which is associated with one of the vertices in the undirected graph, and each of which stores data representing a priority value and/or a status indicator at different times, as described herein. In some embodiments, recording the indication that the given vertex is to be included in the maximal independent set for the graph may include storing the indication in an array of status indicators, each element of which is associated with one of the vertices in the undirected graph. In other embodiments, recording the indication that the given vertex is to be included in the maximal independent set for the graph may include storing the indication in an array of data structures, each of which is associated with one of the vertices in the undirected graph, and each of which stores data representing a priority value and/or a status indicator at different times, as described herein.

In some embodiments of the present disclosure, the determinations and/or recordings illustrated in FIG. 1 and described above may, for different ones of the vertices of the undirected graph, be performed in parallel on respective processing elements.

Figure 2:
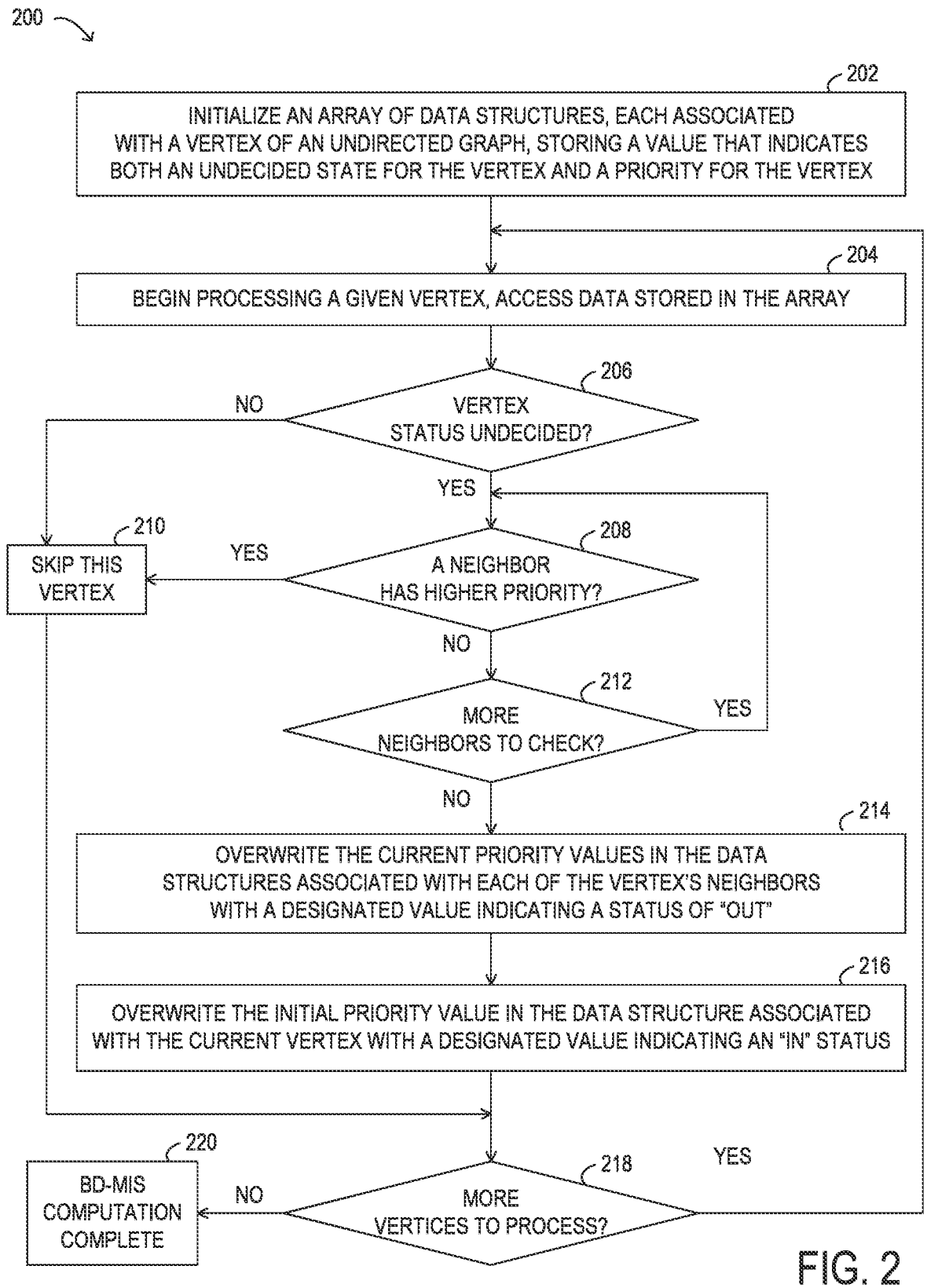
FIG. 2 is a flow diagram illustrating selected elements of a method for performing a BD-MIS computation, in accordance with some embodiments of the present disclosure.

FIG. 2 is a flow diagram illustrating selected elements of a method 200 for performing a BD-MIS computation, in accordance with some embodiments of the present disclosure. Method 200 may be implemented by any of the elements shown in FIG. 4. In some embodiments, method 200 may be implemented by hardware circuitry, which may include any suitable combination of static (fixed-function), dynamic, and/or programmable logic devices. In other embodiments, one or more of the operations of method 200 may be performed or emulated by the execution of program instructions by a processor that includes multiple processing elements. In one embodiment, one or more of the operations of method 200 may be performed by the execution of program instructions by a GPU. Method 200 may be initiated by any suitable criteria and may initiate operation at any suitable point. In one embodiment, method 200 may initiate operation at 202. Method 200 may include greater or fewer operations than those illustrated. Moreover, method 200 may execute its operations in an order different than those illustrated in FIG. 2. Method 200 may terminate at any suitable operation. Moreover, method 200 may repeat operation at any suitable operation. Method 200 may perform any of its operations in parallel with other operations of method 200, or in parallel with operations of other methods. Furthermore, method 200 may be executed multiple times to perform at least a portion of a BD-MIS computation. During the execution of method 200, other methods may be invoked to perform at least some of the operations of method 200.

As illustrated in this example, method 200 may include (at 202) initializing an array of data structures, each of which is associated with a vertex of an undirected graph. In some embodiments, the amount of data stored in, or representing, the data structure associated with each vertex may be small enough to be stored in memory as a small word, e.g., as a single byte. Initializing the array may include, for each vertex, storing a value that indicates both an indication of status (in this case, a status of "undecided") for the vertex and a priority value for the vertex in the data structure associated with the vertex. Method 200 may include (at 204) beginning to process a given vertex, which may include accessing data stored in the array. For example, the method may include accessing data in a data structure associated with the given vertex and data in a respective data structure associated with each of one or more neighbors of the given vertex. If (at 206) it is determined that the status of the vertex is undecided, method 200 may continue to 208. Otherwise, method 200 may proceed to 210. At this point, the given vertex may be skipped, since its status as "in" or "out" of the MIS has already been decided.

At 208, a determination of whether one of the neighbors of the given vertex has a higher priority value than the given vertex may be made. If the neighbor has a higher priority value than the given vertex, method 200 may proceed to 210. At this point, the given vertex may be skipped, since its status cannot yet be determined. If the neighbor does not have a higher priority than the given vertex, method 200 may continue to 212, where a determination of whether there are more neighbors to be checked may be made. While there are more neighbors to check, method 200 may return to 208 to check the priority of the next neighbor and proceed accordingly. If, or once, there are no additional neighbors to check (at 212), method 200 may continue to 214 on the assumption that no neighbor has a higher priority value than the given vertex. Method 200 may include (at 214) overwriting the current priority values stored in the data structures associated with each of the vertex's neighbors with a designated priority value indicating a status of "out". For at least some of the vertex's neighbors, overwriting the current priority value may include overwriting the initial priority value that was stored in its associated data structure. In some embodiments, and for some of the vertex's neighbors, overwriting the current priority value may include writing the designated priority value indicating a status of "out" in a data structure into which this designated priority value was previously written. In other embodiments, if the designated priority value indicating a status of "out" was previously written into a data structure associated with one of the vertex's neighbors, it need not be overwritten.

Method 200 may also include (at 216) overwriting the initial priority value in the data structure associated with the current vertex with a designated priority value indicating an "in" status. If, after marking the status of the current vertex as "in" (at 216) or skipping the current vertex (at 210), method 200 may proceed to 218, where a determination of whether there are more vertices to be checked may be made. While there are more vertices to process, method 200 may return to 204 to process the next vertex (or the next vertex assigned to a particular thread) and may proceed accordingly. If, or once, there are no additional vertices to process, the BD-MIS computation may be complete (as in 220). In some embodiments, once the BD-MIS computation is complete, the results may be returned to the caller of the BD-MIS computation. In some embodiments, returning the results may include returning the contents of, or a pointer to, the array of data structures in which indications of which vertices are "in" the MIS and which vertices are "out" of the MIS are stored.

In some embodiments of the present disclosure, the operations shown in FIG. 2 may be performed in parallel, beginning at different vertices, by multiple processing elements (e.g., processor cores, GPU processing elements) or threads of execution.

Figure 3:
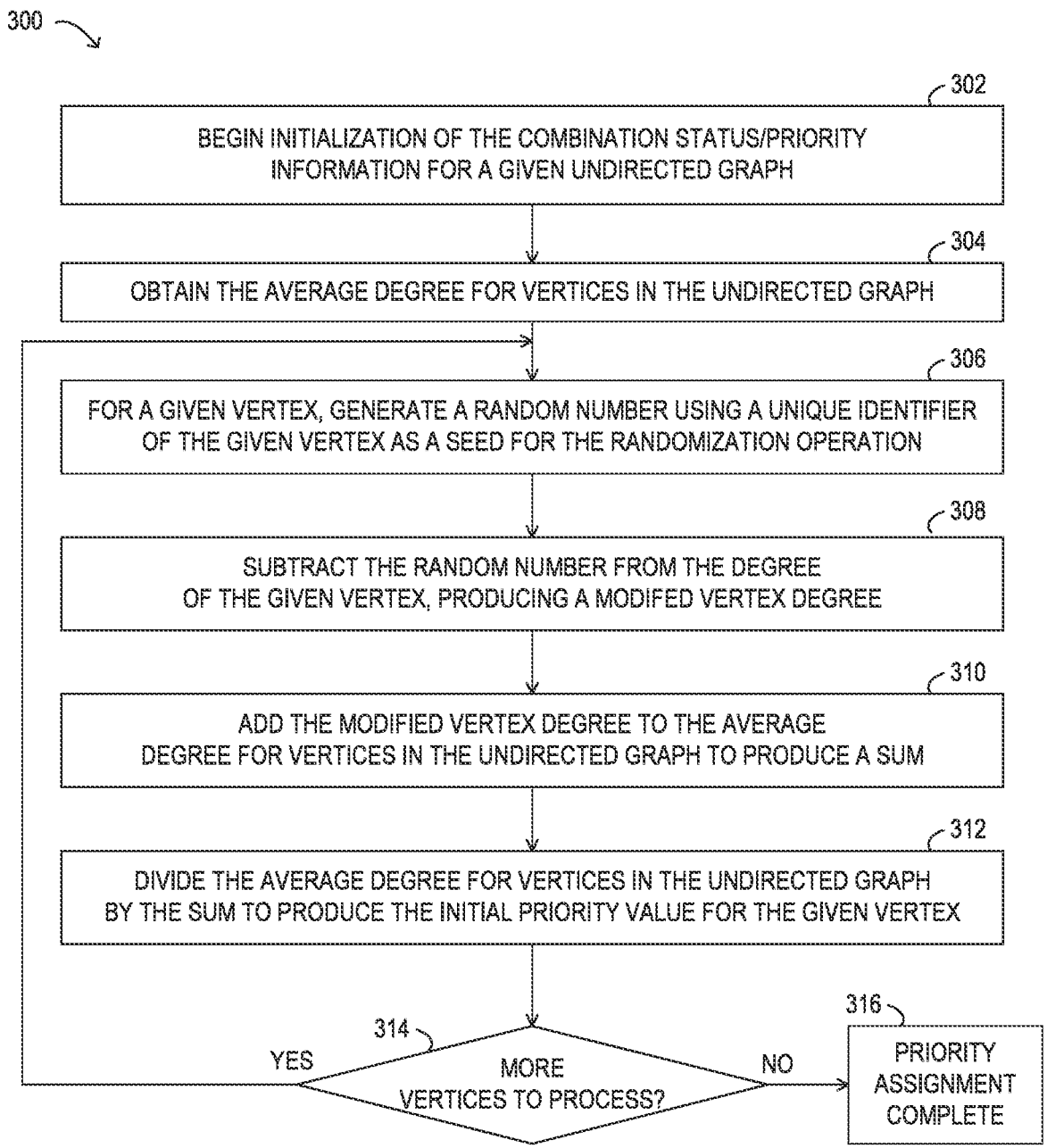
FIG. 3 is a flow diagram illustrating selected elements of a method for initializing combined status/priority information for a given undirected graph, in accordance with some embodiments of the present disclosure.

FIG. 3 is a flow diagram illustrating selected elements of a method 300 for initializing combined status/priority information for a given undirected graph, in accordance with some embodiments of the present disclosure. Method 300 may be implemented by any of the elements shown in FIG. 4. In some embodiments, method 300 may be implemented by hardware circuitry, which may include any suitable combination of static (fixed-function), dynamic, and/or programmable logic devices. In other embodiments, one or more of the operations of method 300 may be performed or emulated by the execution of program instructions by a processor that includes multiple processing elements. In one embodiment, one or more of the operations of method 300 may be performed by the execution of program instructions by a GPU. Method 300 may be initiated by any suitable criteria and may initiate operation at any suitable point. In one embodiment, method 300 may initiate operation at 302. Method 300 may include greater or fewer operations than those illustrated. Moreover, method 300 may execute its operations in an order different than those illustrated in FIG. 3. Method 300 may terminate at any suitable operation. Moreover, method 300 may repeat operation at any suitable operation. Method 300 may perform any of its operations in parallel with other operations of method 300, or in parallel with operations of other methods. Furthermore, method 300 may be executed multiple times to perform at least a portion of a priority-assignment operation within an MIS computation. During the execution of method 300, other methods may be invoked to perform at least some of the operations of method 300.

As illustrated in this example, method 300 may include (at 302) beginning initialization of the combination status/priority information for a given undirected graph. Method 300 may include (at 304) obtaining the average degree for vertices in the undirected graph. Method 300 may include (at 306), for a given vertex, generating a random number using a unique identifier of the given vertex as a seed for the randomization operation. Method 300 may include (at 308) subtracting the random number from the degree of the given vertex to produce a modified vertex degree.

Method 300 may include (at 310) adding the modified vertex degree to the average degree for vertices in the undirected graph to produce a sum. Method 300 may include (at 312) dividing the average degree for vertices in the undirected graph by the sum of the modified vertex degree and the average degree to produce the initial priority value for the given vertex. If (at 314) it is determined that there are more vertices in the graph to process, method 300 may return to 304 to continue assigning priority values to vertices in the undirected graph. However, if (or once), at 314, it is determined that there are no additional vertices left to process, the priority assignment computation may be complete (as in 316).

In some embodiments of the present disclosure, the techniques described herein may be employed in parallel computing system to implement a dynamic parallelization scheme or run-time parallelization mechanism. For example, going forward, the parallelization of large numbers of other programs may be increasingly important. In many cases, it is not possible to look at the code for these programs and just parallelize them, because depending on the inputs to the program, it might have more or less potential for parallelism. In such cases, once a program runs, and the inputs are known, a dependence graph may be computed to determine which computations depend on which other computations. In some embodiments, a BD-MIS computation may be applied to such a dependence graph to identify independent sets for the parallelization of multiple computations for which the inputs to the BD-MIS computation are not available until runtime. In such systems, BD-MIS computations described herein may be significantly faster than alternative MIS implementations.

In various embodiments of the present disclosure, a BD-MIS computation may be used as a building block within other types of computations. For example, a BD-MIS computation may be used in graph coloring. The objective of a graph coloring operation is to assign colors to the vertices of a graph such that no two neighboring vertices have the same color, while using a minimum number of colors to color the entire graph. Thus, a graph coloring computation may produce what are essentially multiple maximal independent sets (one for each color) that are interleaved. Graph coloring is used in many different applications. For example, when a compiler compiles program instructions written in a high-level programming language into machine code, it allocates variables to registers. In this example, the mapping may be implemented as a graph coloring computation in which the vertices are the variables in the code and the colors are the registers available in the hardware. An objective of this graph coloring computation may be determine the mapping such that it uses as few registers as possible while still mapping as many variables as possible for best performance, and so on. This is just one example of the use of graph coloring to minimize resource utilization, any of which may benefit from the use of the BD-MIS computations described herein.

In another example, a BD-MIS computation may be used in a maximal matching computation. Maximal matching is similar to graph coloring except that it attempts to find a maximal number of pairs of adjacent vertices in the graph such that the pairs independent. This type of computation may be performed in many resource-constrained environments in which every task must be paired with a corresponding processing or storage resource, for example.

In yet another example, a BD-MIS computation may be used in 2-satisfiability computation. A 2-satisfiability computation is a Boolean satisfiability computation in which values of "true" or "false" are assigned to a set of variables in order to satisfy a system of constraints on pairs of the variables.

The computation of a maximal independent set is an important step in many real-world computations including, but not limited to, those described herein. In some cases, the identification of a maximal independent set, or multiple such sets, may be employed in efforts to parallelize complex programs that are otherwise difficult to parallelize. In at least some embodiments of the present disclosure, the BD-MIS computations described herein may run faster and produce higher quality results than existing maximal independent set computations that employ other approaches, including other parallel MIS approaches. The use of the BD-MIS computations described herein, including BD-MIS versions that include various subsets of the optimizations included in the default BD-MIS computation, in different combinations, may allow a wide variety of complex graph processing applications to run efficiently on HPCs, while producing high quality results in terms of independent set sizes. In some embodiments, the BD-MIS computations described herein may be executed on hardware accelerators onto which complex graph processing applications, or operations thereof, are off-loaded for execution in parallel with the execution of other applications, or operations thereof, by a primary processing unit (e.g., a general purpose CPU).

In some embodiments, the BD-MIS computations described herein may be provided as a stand-alone application that receives (or accesses in a memory) an undirected graph (e.g., a dependence graph) as an input, and generates (e.g., in an array in memory) a maximal independent set. In other embodiments, one or more versions of the BD-MIS computations described herein may be provided in a library or suite of functions to be called by graph processing applications or other types of applications that include a graph processing component. For example, a function that performs a BD-MIS computation such as any of those described above may be called by a resource utilization application, computation parallelization application, scheduling application, or any other application for which the parallel computation of a maximal independent set using the fast, high-quality parallel MIS approach described herein would be beneficial.

In some embodiments, an application or library function to implement a BD-MIS computation, or any of the methods included therein, may be written in a programming language within a framework for programs that execute across multiple hardware platforms, such as the Open Computing Language (OpenCL) framework. This framework provides a standard interface for parallel computing on multi-core, multi-threaded CPUs, GPUs, digital signal processors (DSPs), field-programmable gate arrays (FPGAs) and other processors or hardware accelerators. In other embodiments, an application or library function to implement a BD-MIS computation, or any of the methods included therein, may be written in a program language within the CUDA computing platform developed by Nvidia Corporation. This framework may provide a standard interface for parallel computing, including an interface to directly access the virtual instruction set and parallel computing elements of one or more CUDA-enabled GPUs. For example, an application or library function to implement a BD-MIS computation, or any of the methods included therein, may be written to include elements of an open-source CUDA library of parallel algorithms for sparse linear algebra and graph computations. In at least some of the evaluations described herein, the source code for the BD-MIS computations was implemented in accordance with the CUDA computing platform. In some embodiments, a BD-MIS computation may be integrated directly into an application requiring an MIS, in which case the source code may be written in the same programming language as the application into which it is integrated. In other embodiments, the source code for a BD-MIS computation may be written in a different programming language than the programming language in which the source code for the application into which it is directly or indirectly integrated. In some embodiments, a BD-MIS computation, for which the source code may be written any suitable programming language, may be integrated into the operating system of an HPC, including an HPC that includes one or more multi-threaded, multi-core processors and/or arrays of GPUs.

Figure 4:
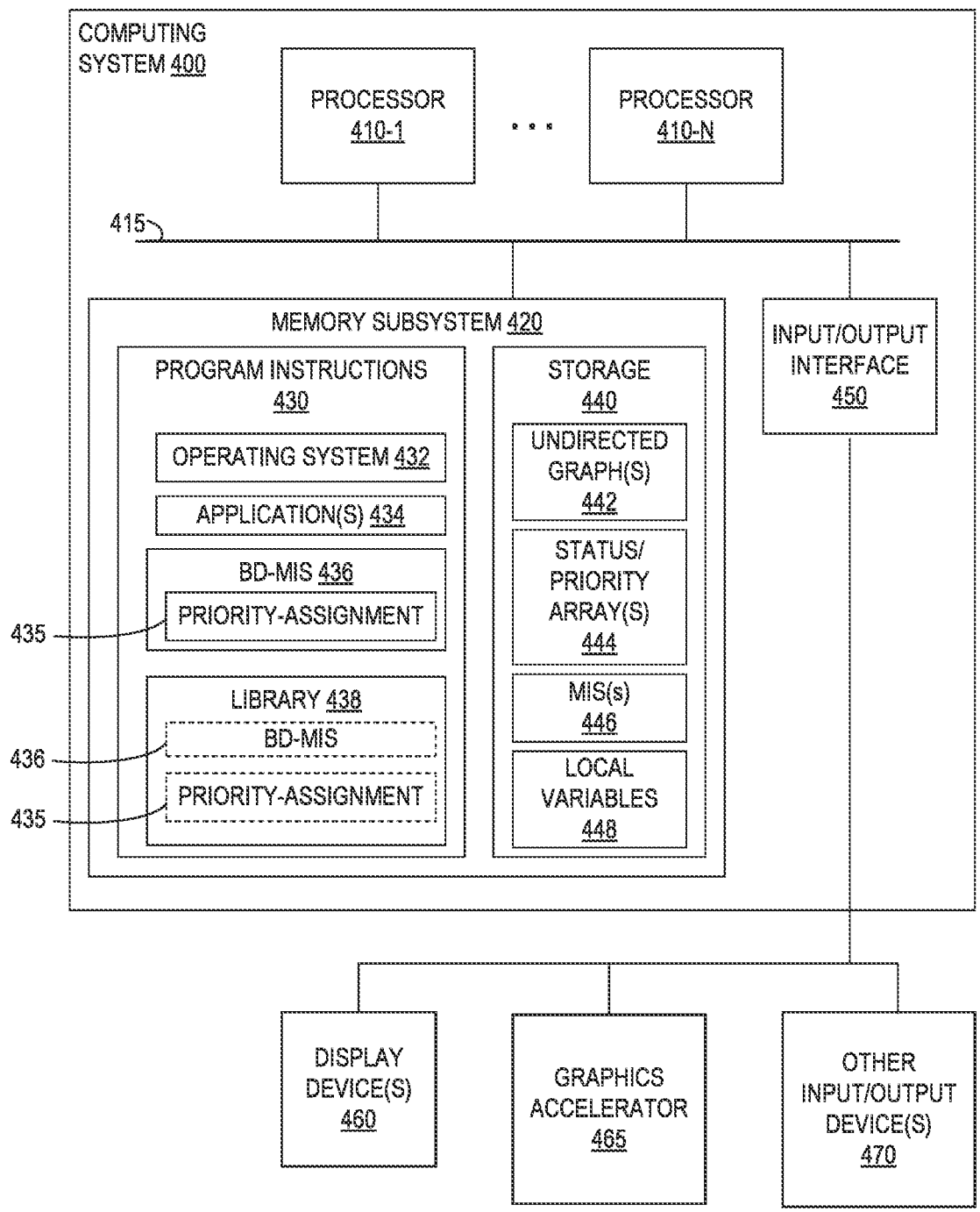
FIG. 4 is a block diagram illustrating selected elements of an example computing system for identifying maximal independent sets in parallel, according to one embodiment.

FIG. 4 is a block diagram illustrating selected elements of an example computing system 400 for identifying maximal independent sets in parallel, according to one embodiment. In this example embodiment, computing system 400 includes one or more processors 410. Each of processors 410 may include circuitry or logic to interpret or execute program instructions and/or to process data. For example, each processor 410 may include a microprocessor, microcontroller, digital signal processor (DSP), graphics processor (GPU), or application specific integrated circuit (ASIC). In some embodiments, one or more of processors 410 may be a multi-core and/or multi-threaded processor including circuitry to execute program instructions in parallel on behalf of operating system 432, BD-MIS 437, an application 434, or any of the functions resident in library 437. Processors 410 may interpret and/or execute program instructions and/or process data stored locally in memory subsystem 420 or remotely (not shown).

Processors 410 may implement any instruction set architecture (ISA), in different embodiments. In some embodiments, all of the processors 410 may implement the same ISA. In other embodiments, two or more of processors 410 may implement different ISAs. Processors 410 are coupled to a memory subsystem 420 and an input/output subsystem 450 via a system interface 415. System interface 415 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express (PCIe) bus, or a HyperTransport (HT) bus, in various embodiments.

In various embodiments, memory subsystem 420 may include random access memory (RAM), read-only memory (ROM), electrically erasable programmable read-only memory (EEPROM), flash memory, magnetic storage, opto-magnetic storage, and/or any other type of volatile or non-volatile memory. In some embodiments, memory subsystem 420 may include non-transitory computer-readable media, e.g., a hard disk drive, floppy disk drive, CD-ROM, and/or other type of rotating storage media, and/or another type of solid state storage media.

In the example embodiment illustrated in FIG. 4, memory subsystem 420 includes program instructions 430, including program instructions that when executed by one or more of the processors 410 implement some or all of the methods described herein for identifying maximal independent sets and performing priority assignments to the vertices of an undirected graph, as well as other methods. For example, program instructions 430 include operating system 432, applications 434 (which may include one or more applications that call BD-MIS code 436), BD-MIS code 436 (which may include one or more priority assignment functions 439), and library 438 (which may include utilities within a custom or commercially available parallel computing tool suite or GPU tool suite). In some embodiments, BD-MIS code 436 and/or priority assignment function(s) 435 may be included in library 438 (as shown by the dashed lines in FIG. 4). In the example embodiment illustrated in FIG. 4, storage 440 within memory subsystem 420 may include storage for one or more undirected graphs (shown as 442), one or more status and/or priority arrays 444, storage for one or more maximal independent sets 446, and storage for one or more local variables accessible by particular threads during execution of program instructions 430 (shown as 448). In some embodiments, arrays 444 may include one or more arrays for storing status information for vertices of an undirected graph and one or more other arrays for storing priority information for those vertices. In other embodiments, an array 444 may store data values that indicate, for each vertex, its status and, if its status is undecided, its priority, as described herein.

In the example embodiment illustrated in FIG. 4, input/output interface 450 may implement any of a variety of digital and/or analog communication interfaces, graphics interfaces, video interfaces, user input interfaces, and/or peripheral interfaces for communicatively coupling input/output devices or other remote devices to the components of computing system 400. For example, input/output interface 450 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express (PCIe) bus, or a HyperTransport (HT) bus, in various embodiments. Input/output interface 450 may generate signals to be provided (e.g., via one or more output pins of computing system 400) to one or more display devices 460, a graphics accelerator card 465, and/or other input/output devices 470 (such as a keyboard, a mouse, a camera, a microphone, a universal asynchronous receiver/transmitter (UART) device or device interface, a universal serial bus (USB) device or device interface, a Bluetooth wireless UART device or device interface or an I/O expansion interface device).

In one example, input/output interface 450 may generate signals encoding data for display of a graphical user interface (GUI) or command line interface to be provided to a display device 460. In another example, input/output interface 450 may generate signals encoding data representing an undirected graph 442 to be provided to graphics accelerator 465. Graphics accelerator 465 may include circuitry or logic to perform graphics processing operations, including BD-MIS computations and/or priority-assignment functions thereof. In one example, graphics accelerator 465, rather than processor(s) 410, may execute program instructions or to identify a maximal independent set for the undirected graph 442, and may provide the result to computing system 400 through input/output interface 450.

In one embodiment, graphics accelerator 465 may include elements similar to the elements of computing system 400, e.g., multiple processors or processing elements, and a memory including program instructions (including, e.g., instructions for implementing BD-MIS 436 and/or priority-assignment function 435) and storage (including, e.g., storage for one or more undirected graphs 442, one or more arrays for storing status and/or priority information, results of various MIS computations 446, and/or local variables 448). In another embodiment, an input/output device 470 may include elements similar to the elements of computing system 400, e.g., multiple processors or processing elements, and a memory including program instructions (including, e.g., instructions for implementing BD-MIS 436 and/or priority-assignment function 435) and storage (including, e.g., storage for one or more undirected graphs 442, one or more arrays for storing status and/or priority information, results of various MIS computations 446, and/or local variables 448). In still other embodiments, an input/output device 470 may include one or more digital signal processors (DSPs), field-programmable gate arrays (FPGAs) and/or other processors or hardware accelerators comprising circuitry or logic to implement the functionality of BD-MIS 436 and/or priority-assignment function 435.

The BD-MIS implementation described herein was evaluated along with three other GPU implementations of MIS computations. One of the additional evaluated MIS computations is included in a library of functions designed for use on a particular GPU, while the other two are included in benchmarking suites used to evaluate GPUs. The evaluations were performed on GPUs of two different generations, one of which includes 3072 processing elements distributed over 24 multiprocessors that can hold the contexts of 49,152 threads, and the other of which includes 2880 processing elements distributed over 15 multiprocessors that can hold the contexts of 30,720 threads. Each of the GPUs was coupled to the computing system on which the evaluations were run through a respective PCIe 3.0 slot. The computing system included dual 10-core CPUs running at 3.1 GHz. When measuring the performance, only the computation time was considered, excluding the time it took to transfer the graphs to the GPU or to transfer the results back. In other words, it was assumed that the graph was already be on the GPU from a prior processing step and the result of the MIS computation was needed on the GPU by a later processing step. Each experiment was repeated seven times and the median performance was reported. The quality of the solution was measured in term of the MIS size. To verify the correctness of the BD-MIS computation solution, it was verified that after each run that every vertex was marked as "in" or "out", every "in" vertex had only "out" neighbors, and every "out" vertex had at least one "in" neighbor.

Sixteen graphs were provided as inputs, including road maps, a grid, a random graph, RMAT graphs, a synthetic Kronecker graph, a product co-purchasing graph, Internet topology graphs, publication citation graphs, a patent citation graph, a Delaunay triangulation graph, and web-links graphs. Where necessary, the graphs were modified to eliminate loops (self-edges) and multiple edges between the same two vertices. Furthermore, any missing back edges were added to make the graphs undirected. These graphs varied substantially in type and size. The number of vertices differed by up to a factor of 365, the number of edges by up to a factor of 1352, the average degree by up to a factor of 36, and the maximum degree by up to a factor of 53476. This wide variety of inputs was selected to demonstrate the performance and quality of the tested codes under many different settings.

Since the absolute runtimes varied by over a factor of 40000, the performance results were presented in terms of throughput, using the traversed edges per second (TEPS) metric (i.e., the number of edges divided by the median runtime). Unlike runtime, TEPS is a higher-is-better metric. The throughput for BD-MIS ranged from 3.0 to 50.8 GTEPS on one GPU with an average of 12.5 GTEPS. On the other GPU, it ranged from 2.5 to 20.6 GTEPS with an average of 6.4 GTEPS. BD-MIS was faster than the other three MIS computations on all 16 graphs on both GPUs. Even its lowest throughput was significantly higher than the highest throughput of the other MIS computations. On average, BD-MIS outperformed the other MIS computations by factors of 55.8, 13.1, and 12.0, respectively, on one GPU, and by factors of 43.8, 11.0, and 9.5 on, respectively, on the other.

In general, BD-MIS's performance advantage correlated with the average degree of the input graph. This may be due to the fact that BD-MIS only searches for the first neighbor whose priority is higher than that of the current vertex, rather than visiting all neighbors to identify the neighbor with the highest priority. Since BD-MIS uses an asynchronous implementation, its throughput depends on internal timing behavior. An analysis of throughput variability between seven runs of the same input on the on GPU relative to the median throughput showed that, due to its asynchronous nature, BD-MIS does not exhibit large throughput variations. The average variability was within one percent (±0.7%) and the largest observed variation was a little over two percent (±2.2%), meaning that the throughput is quite stable. This variability is insignificant compared to BD-MIS's performance advantage of at least 380%.

As the absolute MIS sizes varied by nearly a factor of 500, the set sizes were presented as fractions of the total number of vertices. Since the MIS computations are deterministic, they always produced the same maximal independent set for a given input, irrespective of the GPU on which they were run.

BD-MIS yielded larger sets than one of the other MIS computations for all tested input graphs. It also produced larger sets than the other two MIS computations for all except one of the input graphs, where the other two MIS computations resulted in sets that were 0.1% larger. On average, the use of the BD-MIS priority-assignment function described above yielded 10% larger MIS sizes. For one input graph, its solution was at least 18.5% larger than that of the other three MIS implementations.

In some embodiments of the BD-MIS computation that employ randomization, the solution produced by the computation may depend, to some degree, on random chance. In some embodiments, the BD-MIS computation may use the vertex IDs as seeds for the random number generation within a priority-assignment function. The effect on the quality of the MIS produced by BD-MIS computations when using different random numbers has been tested by running experiments in which ten thousand was added to each vertex ID and when ten million was added to each vertex ID before using them as seeds for random number. The resulting MIS sizes were almost identical to the baseline results. Even in the most extreme case, they differ by less than 0.1%, illustrating that the solution quality of BD-MIS is not significantly affected by the choice of the seed. In some embodiments of the BD-MIS computation, the priority-assignment function may only apply randomization among vertices of the same degree.

In some embodiments, a BD-MIS computation stores the combined status and priority information of each vertex in a single byte. To test whether using only eight bits degrades the solution quality, two additional versions of BD-MIS, one that uses two-byte words (short words) and another that uses four-byte words (integers) to hold this information, each of which results in a much larger range of possible priorities, were evaluated. This experiment yielded almost identical set sizes that differed by no more than 0.07% on the 16 graphs, when compared to the results of the single byte implementation. In at least some embodiments, a single byte may provide a large enough range of values for recording the priorities. This evaluation illustrated that, while using only eight bits to store the combined status and priority information does not negatively affect the result quality, it does improve performance. On average, BD-MIS computations that employed a single byte to store this information ran 6.1% faster when executed on one of the GPUs than those that employed short words and 17.3% faster than those that employed integers. The benefit was even more pronounced for similar computations executed on the other GPU. For example, using short words to store this information resulted in a 15.5% drop in throughput, on average, compared to the single byte implementation, and using integers resulted in a 32.8% drop in throughput, on average. These experiments demonstrated that storing the combined status/priority information using a single byte per vertex may not lower the quality of the result but may substantially speeds up the execution of the computation.

Another evaluation was directed to the effects of different priority assignments on the quality of the results generated by BD-MIS computations. Both priority-assignment function (1) above, which does not include randomization, and priority-assignment function (2) above, which includes randomization, were evaluated. The evaluation included a random-permutation parallel MIS approach that implements a uniformly distributed random priority and uses four bytes to hold the priorities, and a random-selection parallel MIS approach in which the vertices are selected with probability $1/(2d(v))$).

A plot of MIS as a fraction of the total number of vertices, for each of the different priority-assignment functions, showed that omitting randomization in the priority-assignment function of BD-MIS may result in a slight increase in set size in some cases and may result in a slight decrease in set size in other cases. In no cases did the set size change significantly, with the average resulting set size being nearly identical. However, this result does indicate that the additional of randomization is useless. For example, without randomization, there may be many ties in priority, each of which necessitates the invocation of a tie breaker function. As described in more detail below, the execution of the extra code in the tie breaker function may slow down the execution of the computation. For example, in some cases, the execution time of the computation without randomization in the priority-assignment function was over 6% longer than when randomization was included in the priority-assignment function.

Another study illustrated how different ones of the MIS code transformations described herein affect the performance of BD-MIS, with the results being presented in terms of average throughput over all input graphs. The different versions of BD-MIS evaluated in the study included the BD-MIS implementation shown in the pseudo code above (which is referred to in this discussion as "default BD-MIS"), a "BD-2B" version in which two-byte words are used to store the combined status/priority information for each vertex, a "BD-4B" version in which four-byte words are used to store the combined status/priority information, a "BD-no-random" version in which randomization is disabled in the priority-assignment function, a "BD-in-out" version in which a vertex is marked as "in" before its neighbors are marked as "out", a "BD-sync" version (which is a synchronous implementation that executes multiple explicit rounds), a "BD-all-neighbors" version in which the highest-priority neighbor is identified (rather than just any neighbor with a higher priority than the current vertex), a "BD-2-arrays" version in which the status information and the priority information for the vertices are stored in separate byte arrays. Also included in the evaluation was the fastest of the three existing GPU MIS implementations described earlier.

In this study, the default BD-MIS yielded the highest throughput, on average. Marking vertices as "in" before marking their neighbors as "out (as in BD-in-out) resulted in a negligible performance drop of 0.2%. While disabling randomization (as in BD-no-random) did not affect the quality of the MIS result, it did lower the average throughput by 6.9% for computations executed on one GPU and by 6.1% for computations executed on the other GPU. Using larger word sizes (such as in BD-2B and BD-4B) did not affect the quality of the MIS result, but reduced the throughput for computations that employed these BD-MIS versions. For example, using two-byte words to store the combined status/priority information lowered the throughput by 6.1% for computations executed on one GPU and by 15.5% for computations executed on the other GPU. Similarly, using four-byte words to store the combined status/priority information lowered the throughput by 17.3% for computations executed on one GPU and by 32.8% for computations executed on the other GPU. This may be due, at least in part, to fact that the larger word sizes increase the memory footprint, which decreases locality (and thus, in-cache presence) and reduces the transfer efficiency (as fewer words are transferred per bus transaction).

In this study, forcing BD-MIS to run synchronously (as in BD-sync) was shown to decrease performance drastically. For example, for one input graph, the throughput on one of the GPUs dropped by 61.3%. The average drop in throughput across all input graphs on that GPU was 18.4%, while the average drop on the other GPU was 16.3%. Using separate arrays to hold the status and priority information, as is common in many other MIS codes, impacted the performance even more. On one of the GPU, this modification reduced the throughput by 19.2%, while on the other GPU this modification reduced the throughput by 18.3%. In this study, it was demonstrated that the code modification having the greatest positive impact on the performance of BD-MIS computations was the modification that removed the requirement to visit all neighbors in order to identify the neighbor with the highest priority. Always visiting all neighbors (as in the BD-all-neighbors version and in the three existing GPU MIS implementation described herein), resulted in a drop in throughput of 53.3% on one GPU and 58.7% on the other GPU, on average. In other words, the performance in terms of throughput was shown to be less than half that of the versions in which the search stops after identifying any neighbor that has a higher priority than the current vertex.

These evaluations collectively illustrate that the higher-performance and/or larger set sizes achieved using the default BD-MIS implementation described herein may not be the result of any single one of the optimization, but may be affected by the inclusion of different combination of multiple ones of these optimizations, in different embodiments.

In various embodiments of the present disclosure, systems for identifying maximal independent sets may employ the BD-MIS approach described herein. In at least some of these embodiments, the BD-MIS approach may be faster than existing parallel MIS approaches and may produce larger maximal independent sets than those produced by existing MIS approaches. Moreover, the BD-MIS approached described herein may use less auxiliary memory than existing parallel MIS approaches and may be asynchronous. For example, the computation stage of BD-MIS requires no explicit synchronization, making it a particularly good fit for execution on massively-parallel architectures, including GPUs. In at least some embodiments, a BD-MIS computation may employ a partially randomized priority-assignment function to boost the expected set size. This priority-assignment function may be suitable for integration into other MIS implementations. Furthermore, BD-MIS exploits monotonicity and a chaotic relaxation approach that is not only fast but also produces a deterministic result. Other performance and quality optimizations to the BD-MIS computation are describe herein. At least some of these optimizations may be orthogonal to each other. At least some of these optimizations may be suitable for application to other MIS implementations either independently or in combination. In particular, the memory reduction optimization and the priority assignment for boosting the set size described above may be useful in other parallel MIS implementations such as parallel implementations to be executed on multicore CPUs or some serial implementations.

Although example embodiments of the present disclosure are specifically described above, it will be appreciated that modifications and variations of these examples are possible without departing from the spirit and intended scope of the disclosure. For example, while several examples herein describe BD-MIS in a context in which the BD-MIS computation is executed using parallel computing (e.g., by multiple processing elements of a CPU or GPU), in other embodiments, the BD-MIS computations described herein may be executed in a sequential manner. In at least some of these embodiments, or more of the optimizations included in the default BD-MIS described herein may result in larger set sizes, reduced memory usage, and/or higher performance when compared to other sequential MIS approaches.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by the law, the scope of the present disclosure is to be determined by the broadest permissible interpretation of the following claims and their equivalents, and shall not be restricted or limited by the foregoing detailed description.

What is claimed is:

1. A method comprising, on a processor:
    accessing data representing an undirected graph, the undirected graph including vertices and edges, each edge connecting a respective pair of vertices;
    generating a respective initial priority value for each vertex, the initial priority being dependent on the degree of the vertex and on an average degree for vertices in the undirected graph;
    recording an indication of the respective initial priority value for each vertex in a memory;
    determining, for each vertex in a first plurality of vertices in the undirected graph, dependent on the indications recorded in the memory, that no neighbor vertex connected to the vertex by one of the edges in the undirected graph has a priority value that is higher than the initial priority value for the vertex;
    recording, in the memory in response to a determination that no neighbor vertex connected to a first one of the first plurality of vertices by one of the edges has a priority value that is higher than the initial priority value for the first vertex:
        respective indications that each neighbor vertex connected to the first vertex by one of the edges is not to be included in a maximal independent set for the undirected graph; and
        an indication that the first vertex is to be included in the maximal independent set for the undirected graph.

2. The method of claim 1, wherein, for each vertex in the undirected graph:
    recording an indication of the respective initial priority value for the vertex comprises storing, in a data structure associated with the vertex, a value that simultaneously represents an indication of an undecided status for the vertex and the respective initial priority value for the vertex;
    recording a respective indication that each neighbor vertex connected to the vertex by one of the edges is not to be included in a maximal independent set for the undirected graph comprises storing, in a respective data structure associated with the neighbor vertex, a first designated priority value that represents an indication of an out status for the neighbor vertex;
    recording an indication that the vertex is to be included in the maximal independent set for the undirected graph comprises storing, in the data structure associated with the vertex, a second designated priority value that represents an in status for the vertex; and
    the value that simultaneously represents an indication of an undecided status for the vertex and the respective initial priority value for the vertex is a value other than the first designated priority value or the second designated priority value.

3. The method of claim 2, wherein:
    the first designated priority value is the lowest possible value to be stored in the respective data structure associated with each neighbor vertex;
    the second designated priority value is the highest possible value to be stored in the data structure associated with the vertex; and
    the value that simultaneously represents an indication of an undecided status for the vertex and the respective initial priority value for the vertex is a value that lies between the first designated priority value and the second designated priority value.

4. The method of claim 2, wherein:
    the first designated priority value is an even number;
    the second designated priority value is an even number; and
    the value that simultaneously represents an indication of an undecided status for the vertex and the respective initial priority value for the vertex is an odd number.

5. The method of claim 2, further comprising:
    determining, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices; and
    in response to determining that a neighbor vertex connected to the vertex in the second plurality of vertices by one of the edges in the undirected graph has a priority value that is higher than the initial priority value for the vertex in the second plurality of vertices:
        refraining from recording data representing a status for the vertex in the second plurality of vertices in the respective data structure associated with the vertex in the second plurality of vertices; and
        refraining from determining whether an additional neighbor vertex connected to the vertex in the second plurality of vertices by one of the edges in the undirected graph has a priority value that is higher than the initial priority value for the vertex in the second plurality of vertices.

6. The method of claim 1, wherein:
    the method further comprises:
        recording, in the memory in response to a determination that no neighbor vertex connected to a second one of the first plurality of vertices by one of the edges has a priority value that is higher than the initial priority value for the second vertex:
            respective indications that each neighbor vertex connected to the second vertex by one of the edges is not to be included in a maximal independent set for the undirected graph; and
            an indication that the second vertex is to be included in the maximal independent set for the undirected graph; and
    at least one of the determinations and the recordings are performed asynchronously and in parallel by respective ones of a plurality of processing elements of the processor.

7. The method of claim 1, wherein:
recording the indication that the first vertex is to be included in the maximal independent set for the undirected graph is performed subsequent to recording the respective indications that each neighbor vertex connected to the first vertex by one of the edges is not to be included in a maximal independent set for the undirected graph;
the method further comprises determining that the vertices in the first plurality of vertices have an undecided status; and
determining, for each vertex in a first plurality of vertices in the undirected graph, that no neighbor vertex connected to the vertex by one of the edges in the undirected graph has a priority value that is higher than the initial priority value for the vertex is performed in response to the determination that the vertices in the first plurality of vertices have an undecided status.

8. The method of claim 1, wherein generating the respective initial priority value for each vertex comprises:
obtaining the average degree for vertices in the undirected graph;
adding the vertex degree to the average degree for vertices in the undirected graph to produce a sum; and
dividing the average degree for vertices in the undirected graph by the sum to produce the respective initial priority value.

9. The method of claim 1, wherein generating the respective initial priority value for each vertex comprises:
obtaining the average degree for vertices in the undirected graph;
generating a random number dependent on a unique identifier of the vertex;
subtracting the random number from the degree of the vertex to produce a modified vertex degree;
adding the modified vertex degree to the average degree for vertices in the undirected graph to produce a sum; and
dividing the average degree for vertices in the undirected graph by the sum to produce the respective initial priority value.

10. An apparatus, comprising means for performing any of the methods of claim 1.

11. At least one non-transitory, computer-readable medium storing instructions that when executed by a processor cause the processor to perform:
accessing data representing an undirected graph, the undirected graph including vertices and edges, each edge connecting a respective pair of vertices;
generating a respective initial priority value for each vertex, the initial priority being dependent on the degree of the vertex and on an average degree for vertices in the undirected graph;
recording an indication of the respective initial priority value for each vertex in a memory;
determining, for each vertex in a first plurality of vertices in the undirected graph, dependent on the indications recorded in the memory, that no neighbor vertex connected to the vertex by one of the edges in the undirected graph has a priority value that is higher than the initial priority value for the vertex;
recording, in the memory in response to a determination that no neighbor vertex connected to a first one of the first plurality of vertices by one of the edges has a priority value that is higher than the initial priority value for the first vertex:
respective indications that each neighbor vertex connected to the first vertex by one of the edges is not to be included in a maximal independent set for the undirected graph; and
an indication that the first vertex is to be included in the maximal independent set for the undirected graph;
determining, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices; and
in response to determining that a neighbor vertex connected to the vertex in the second plurality of vertices by one of the edges in the undirected graph has a priority value that is higher than the initial priority value for the vertex in the second plurality of vertices:
refraining from recording data representing a status for the vertex in the second plurality of vertices in the respective data structure associated with the vertex in the second plurality of vertices; and
refraining from determining whether an additional neighbor vertex connected to the vertex in the second plurality of vertices by one of the edges in the undirected graph has a priority value that is higher than the initial priority value for the vertex in the second plurality of vertices.

12. The medium of claim 11, wherein, for each vertex in the undirected graph:
recording an indication of the respective initial priority value for the vertex comprises storing, in a data structure associated with the vertex, a value that simultaneously represents an indication of an undecided status for the vertex and the respective initial priority value for the vertex;
recording a respective indication that each neighbor vertex connected to the vertex by one of the edges is not to be included in a maximal independent set for the undirected graph comprises storing, in a respective data structure associated with the neighbor vertex, a first designated priority value that represents an indication of an out status for the neighbor vertex;
recording an indication that the vertex is to be included in the maximal independent set for the undirected graph comprises storing, in the data structure associated with the vertex, a second designated priority value that represents an in status for the vertex; and
the value that simultaneously represents an indication of an undecided status for the vertex and the respective initial priority value for the vertex is a value other than the first designated priority value or the second designated priority value.

13. The medium of claim 12, wherein:
the first designated priority value is the lowest possible value to be stored in the respective data structure associated with each neighbor vertex;
the second designated priority value is the highest possible value to be stored in the data structure associated with the vertex; and
the value that simultaneously represents an indication of an undecided status for the vertex and the respective initial priority value for the vertex is a value that lies between the first designated priority value and the second designated priority value.

14. The medium of claim 12, wherein:
the first designated priority value is an even number;
the second designated priority value is an even number; and
the value that simultaneously represents an indication of an undecided status for the vertex and the respective initial priority value for the vertex is an odd number.

15. The medium of claim 11, wherein:
when executed by the processor, the instructions further cause the processor to perform:
recording, in the memory in response to a determination that no neighbor vertex connected to a second one of the first plurality of vertices by one of the edges has a priority value that is higher than the initial priority value for the second vertex:
respective indications that each neighbor vertex connected to the second vertex by one of the edges is not to be included in a maximal independent set for the undirected graph; and
an indication that the second vertex is to be included in the maximal independent set for the undirected graph; and
at least one of the determinations and the recordings are performed asynchronously and in parallel.

16. The medium of claim 11, wherein:
recording the indication that the first vertex is to be included in the maximal independent set for the undirected graph is performed subsequent to recording the respective indications that each neighbor vertex connected to the first vertex by one of the edges is not to be included in a maximal independent set for the undirected graph;
when executed by the processor, the instructions further cause the processor to perform determining that the vertices in the first plurality of vertices have an undecided status; and
determining, for each vertex in a first plurality of vertices in the undirected graph, that no neighbor vertex connected to the vertex by one of the edges in the undirected graph has a priority value that is higher than the initial priority value for the vertex is performed in response to the determination that the vertices in the first plurality of vertices have an undecided status.

17. The medium of claim 11, wherein generating the respective initial priority value for each vertex comprises:
obtaining the average degree for vertices in the undirected graph;
adding the vertex degree to the average degree for vertices in the undirected graph to produce a sum; and
dividing the average degree for vertices in the undirected graph by the sum to produce the respective initial priority value.

18. The medium of claim 11, wherein generating the respective initial priority value for each vertex comprises:
obtaining the average degree for vertices in the undirected graph;
generating a random number dependent on a unique identifier of the vertex;
subtracting the random number from the degree of the vertex to produce a modified vertex degree;
adding the modified vertex degree to the average degree for vertices in the undirected graph to produce a sum; and
dividing the average degree for vertices in the undirected graph by the sum to produce the respective initial priority value.

19. A system, comprising:
a processor;
a memory coupled to the processor and storing program instructions that when executed by the processor cause the processor to:
access data representing an undirected graph, the undirected graph including vertices and edges, each edge connecting a respective pair of vertices;
generate a respective initial priority value for each vertex, the initial priority being dependent on the degree of the vertex and on an average degree for vertices in the undirected graph;
record an indication of the respective initial priority value for each vertex in a memory;
determine, for each vertex in a first plurality of vertices in the undirected graph, dependent on the indications recorded in the memory, that no neighbor vertex connected to the vertex by one of the edges in the undirected graph has a priority value that is higher than the initial priority value for the vertex;
record, in the memory in response to a determination that no neighbor vertex connected to a first one of the first plurality of vertices by one of the edges has a priority value that is higher than the initial priority value for the first vertex:
respective indications that each neighbor vertex connected to the first vertex by one of the edges is not to be included in a maximal independent set for the undirected graph; and
an indication that the first vertex is to be included in the maximal independent set for the undirected graph;
determine, for at least one vertex in a second plurality of vertices in the undirected graph that a neighbor vertex connected to the vertex in the second plurality of vertices by one of the edges in the undirected graph has a priority value that is higher than the initial priority value for the vertex in the second plurality of vertices; and
in response to the determination that a neighbor vertex connected to the vertex in the second plurality of vertices by one of the edges in the undirected graph has a priority value that is higher than the initial priority value for the vertex in the second plurality of vertices:
refrain from recording data representing a status for the vertex in the second plurality of vertices in the respective data structure associated with the vertex in the second plurality of vertices; and
refrain from determining whether an additional neighbor vertex connected to the vertex in the second plurality of vertices by one of the edges in the undirected graph has a priority value that is higher than the initial priority value for the vertex in the second plurality of vertices.

20. The system of claim 19, wherein, for each vertex in the undirected graph:
to record an indication of the respective initial priority value for the vertex, the processor is to record, in a data structure associated with the vertex, a value that simultaneously represents an indication of an undecided status for the vertex and the respective initial priority value for the vertex;
to record a respective indication that each neighbor vertex connected to the vertex by one of the edges is not to be included in a maximal independent set for the undirected graph, the processor is to store, in a respective data structure associated with the neighbor vertex, a first designated priority value that represents an indication of an out status for the neighbor vertex;

to record an indication that the vertex is to be included in the maximal independent set for the undirected graph, the processor is to store, in the data structure associated with the vertex, a second designated priority value that represents an in status for the vertex; and the value that simultaneously represents an indication of an undecided status for the vertex and the respective initial priority value for the vertex is a value other than the first designated priority value or the second designated priority value.

21. The system of claim 20, wherein data representing the data structure associated with the vertex is stored in a single byte in the memory.

22. The system of claim 19, wherein:

the processor is to record the indication that the first vertex is to be included in the maximal independent set for the undirected graph subsequent to recording the respective indications that each neighbor vertex connected to the first vertex by one of the edges is not to be included in a maximal independent set for the undirected graph;

when executed by the processor, the instructions further cause the processor to determine that the vertices in the first plurality of vertices have an undecided status; and the processor is to determine, for each vertex in a first plurality of vertices in the undirected graph, that no neighbor vertex connected to the vertex by one of the edges in the undirected graph has a priority value that is higher than the initial priority value for the vertex is performed in response to the determination that the vertices in the first plurality of vertices have an undecided status.

23. The system of claim 19, wherein to generate the respective initial priority value for each vertex, the processor is to:

obtain the average degree for vertices in the undirected graph;

add the vertex degree to the average degree for vertices in the undirected graph to produce a sum; and divide the average degree for vertices in the undirected graph by the sum to produce the respective initial priority value.

24. The system of claim 19, wherein when executed by the processor, the instructions further cause the processor to:

determine, for at least one vertex in a third plurality of vertices in the undirected graph that a neighbor vertex connected to the vertex in the third plurality of vertices by one of the edges in the undirected graph has a priority value that is equal to the initial priority value for the vertex in the third plurality of vertices; and in response to the determination that a neighbor vertex connected to the vertex in the third plurality of vertices has a priority value that is equal to the initial priority value for the vertex in the third plurality of vertices:

select one of the vertex in the third plurality of vertices or the neighbor vertex connected to the vertex in the third plurality of vertices to be included in the maximal independent set for the undirected graph, wherein the selection is dependent on a unique identifier of the vertex in the third plurality of vertices and a unique identifier of the neighbor vertex connected to the vertex in the third plurality of vertices.

25. The system of claim 19, wherein:

the processor is a CPU or a graphics processor (GPU) comprising a plurality of processing elements;

at least one of the determinations and the recordings are performed asynchronously and in parallel by respective ones of the plurality of processing elements.

* * * * *

UNITED STATES PATENT AND TRADEMARK OFFICE
CERTIFICATE OF CORRECTION

PATENT NO. : 10,599,638 B2
APPLICATION NO. : 16/483285
DATED : March 24, 2020
INVENTOR(S) : Burtscher et al.

Page 1 of 1

It is certified that error appears in the above-identified patent and that said Letters Patent is hereby corrected as shown below:

In the Specification

Replace Column 1 (Lines 7-10) with the following:
"This invention was made with government support under grant nos. 1406304 and DGE1144466 awarded by the National Science Foundation. The government has certain rights in the invention."

Signed and Sealed this
Twenty-fourth Day of December, 2024

Derrick Brent
*Acting Director of the United States Patent and Trademark Office*